US012260844B2

(12) United States Patent
Krobot

(10) Patent No.: US 12,260,844 B2
(45) Date of Patent: Mar. 25, 2025

(54) INTERCHANGEABLE BRIDGE BLOCK SYSTEM FOR A GUITAR

(71) Applicant: Michael Kevin Krobot, Falmouth, MA (US)

(72) Inventor: Michael Kevin Krobot, Falmouth, MA (US)

( * ) Notice: Subject to any disclaimer, the term of this patent is extended or adjusted under 35 U.S.C. 154(b) by 723 days.

(21) Appl. No.: 17/503,622

(22) Filed: Oct. 18, 2021

(65) Prior Publication Data

US 2022/0059059 A1 Feb. 24, 2022

Related U.S. Application Data

(63) Continuation-in-part of application No. 16/893,670, filed on Jun. 5, 2020, now Pat. No. 11,289,056.

(51) Int. Cl.
*G10D 3/04* (2020.01)
*G10D 1/08* (2006.01)

(52) U.S. Cl.
CPC ............... *G10D 3/04* (2013.01); *G10D 1/085* (2013.01)

(58) Field of Classification Search
CPC ................................ G10D 3/04; G10D 1/085
See application file for complete search history.

(56) References Cited

U.S. PATENT DOCUMENTS 4,253,371 A * 3/1981 Guice ...................... G10D 3/04
84/307

* cited by examiner

*Primary Examiner* — Jianchun Qin
(74) *Attorney, Agent, or Firm* — Inventions International Inc.; Tiffany C. Miller

(57) ABSTRACT

A removable bridge block system for a guitar having a first opening bordering a first compartment. A support structure is connected to at least a portion of the first compartment. A bridge block is retained within the first compartment of the body portion of the guitar. The bridge block has a recess configured to receive a plate of the locking mechanism. The locking mechanism has a plate including a disk having a substantially curved edge and a flat edge portion. The plate is retained within a second compartment of the body of the guitar. The plate is configured to rotate, with the force of a user's fingers or with a tool such as a screw driver, within the second compartment of the body of the guitar to orient the substantially curved edge of the plate to be retained within the recess of the bridge block.

20 Claims, 40 Drawing Sheets

INTERCHANGEABLE BRIDGE BLOCK SYSTEM FOR A GUITAR

CROSS REFERENCE TO RELATED APPLICATIONS

This application is a Continuation-In-Part Utility Patent Application, entitled, "Interchangeable Bridge Block System for a Guitar" which claims priority to International PCT Application No. PCT/US21/25893, filed, Apr. 6, 2021, entitled, "Interchangeable Neck and Bridge for a Guitar" which claims priority to Non-Provisional Utility U.S. patent application Ser. No. 16/893,670, filed Jun. 6, 2020, entitled, "Interchangeable Neck and Bridge for a Guitar" which issued as U.S. Pat. No. 11,289,056 on Mar. 29, 2022.

BACKGROUND OF THE INVENTION

1. Field of the Invention

This invention relates, generally, to interchangeable guitar components. More particularly, it relates to a guitar base having a removable bridge block portion, a support structure, and locking mechanism.

2. Background Art

The tone or sound of a guitar changes as a result of the guitar body being made of a certain species of wood or having a pickup configuration. Typically, the neck portion of a guitar determines the feel of the guitar. Guitars may feature a variety of differing neck portions each associated with a unique profile and radius. Further, gauge strings may be configured for specific tuning of the guitar. Despite all of the features available within a single guitar, there is still a need for an interchangeable guitar in which the neck portion can be set to a tuning and interchanged between differing guitars. It would be more desirable for a first neck portion of a guitar to be removable from the body of a guitar and be replaceable with a different second neck portion within 60 seconds and within a range of approximately 0 cents to 50 cents of original tuning. Further, it would be more desirable if a preferred removable neck of a guitar is selected and a user could switch the body of the guitar for different woods and/or electronics. In an alternate embodiment, it would be more desirable if a preferred removable bridge block could be interchangeable with a differing bridge block to facilitate quick interchangeable component installation and removal. This facilitates the removable neck and bridge block to be installed onto any guitar for unlimited customization. It is also more desirable, if a preferred body of a guitar is selected and a user could switch and/or interchange the neck of the guitar for different woods and/or electronics.

Currently, interchangeable guitars being manufactured in today's market require the use of additional tools during the removal and installation process or require the cutting of the guitar strings which is time consuming and costly. It would be more desirable to remove the neck portion of a guitar from the body of a guitar without the need of a tool, such as a screwdriver, to unfasten a plurality of fasteners connecting the neck portion to the body of a guitar. Further, it would be more desirable to remove the neck portion from the body of a guitar without having to cut the strings. As a result, with our improvement, a user could keep two different guitars having different tuning and interchange the neck portion. Thus, there is a need for a guitar to have both a removable neck portion and a removable bridge portion for quick and efficient installation and tuning between a plurality of guitar bodies within a matter of seconds.

It is an important aspect of this instant invention for the removable neck portion to be connected to an improved body of a guitar having an improved bridge block system. It is within the scope of this invention for an existing off the shelf bridge to be connected to an improved removable bridge block system. This improvement to the removable bridge block will enable the guitar to accommodate and be compatible with a diverse variety of bridges. In particular, an existing bridge may be connected to the improved bridge block and the strings are strung through the bridge block. The back of the guitar body features a locking mechanism that is configured to secure the bridge block withing the body of the guitar. In a particular problem, swelling in a wood guitar may occur. This swelling prevents a bridge block from sliding out of the opening of the body of the guitar. When a bridge block is not able to be removed from the guitar, this makes it difficult and/or impossible to interchange the components of the guitar without the use of tools or potentially damaging the guitar during the bridge block removal process. It would be more desirable for the opening of the body of the guitar to have a support structure made of a ridged material including, but not limited to, dense wood, metal, or plastic, to be connected to the inner wall surfaces of the compartment retaining the bridge block. A support structure would maintain the compartment size of the compartment retaining the bridge block so that swelling can not decrease the size or deform the shape of this compartment. A support structure maintains the integrity of the compartment so that a user can still remove the bridge block from the body of a guitar even is the wood material of a guitar experiences swelling due to associated expansion of the wood fibers.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for interchangeable neck and bridge components for a guitar. The guitar has a body. The body of the guitar has a recess having two parallel side walls and a sloped wall. The sloped wall is located between the two parallel side walls. The recess has a bore configured to receive a fastener. The guitar has at least one string. The guitar has a removable neck having a fretboard. The fretboard has a primary side located opposite a secondary side. At least one string is located on the primary side of the fretboard. The removable neck of the guitar has an end having a capturing structure connected to the secondary side of the fretboard. The fretboard protrudes beyond the outer perimeter edge of the capturing structure. The capturing structure has a guide ramp. The capturing structure has a bore configured to receive the fastener. The bore of the capturing structure is aligned with the bore of the recess of the body of the guitar when the capturing structure of the neck of the guitar is received by the recess of the body of the guitar. The neck of the guitar is secured to the body of the guitar when the bore of the recess of the body of the guitar and the bore of the capturing structure receives the fastener, and which also includes improvements that overcome the limitations of prior art interchangeable guitar components is now met by a new, useful, and non-obvious invention.

It is within the scope of this invention for the fastener to include, but not be limited to, a bolt and/or a hinge pin. This single bolt fastens the removable neck of the guitar to the body of the guitar. In particular, a hinge pin could be received by a first opening of the capturing structure and/or a bolt could be received by a second opening of the capturing structure. When it is desirable to replace the first neck of the guitar with a second neck of the guitar, the first step is to remove the bolt. The bolt may be removed and/or installed with a tool and/or may be removed and/or installed with an electromechanical fastening mechanism.

In a second alternate embodiment, the fastener is rotated into a cam locking fastener located within the capturing structure of the removable neck by a belt. The belt is connected to a nut and is driven by a motor. The motor is configured to be actuated when a user activates a switch on the body of the guitar. It is within the scope of this current invention for the switch to include, but not be limited to, a rocker switch or a toggle switch. The button is in electrical communication with the motor. It is within the scope of this invention for an electric motor to be driven by a power source including, but not limited to, a battery and/or an alternating current.

When the fastener is removed from the bore of the capturing structure of the removable neck and removed from the bore of the body of the guitar, the guitar strings will loosen when the capturing structure of the removable neck is removed from the recess of the body of the guitar. Further, the removable bridge retaining the end portions of the guitar strings will slide off the bushings and/or posts of the tremolo block or from the bushings and/or posts of the guitar body. Next, a replacement neck and bridge may be installed onto the guitar body. It is within the scope of this invention for the bridge to slide off two posts of the tremolo block or body of the guitar. The bridge is configured to be removably connected from a first guitar with no tremolo to a second guitar having a tremolo block.

The removable bridge may connect to bushings of a tremolo block of a guitar or to fasteners of a guitar. The tremolo block has a first end located opposite a second end. The first end of the tremolo block has at least one bushing configured to receive at least a portion of the removable bridge such as a recess of the bridge. The first end of the tremolo block has a flange. The flange of the first end of the tremolo block has at least one recess configured to engage a bushing and/or post of the body of the guitar.

The guitar has a removable bridge. The removable bridge has a first side located opposite a second side. The first side of the bridge has at least one recess. The at least one recess of the first side of the bridge has at least one flange. It is within the scope of this invention for a flange to be located on both sides of the recess to engage a portion of a removable slider. The at least one recess of the first side of the bridge is configured to receive a slider. The second side of the bridge has at least one recess. The at least one recess of the second side of the bridge has at least one flange. The at least one recess of the second side of the bridge receives at least one bushing of the tremolo block, thereby, orienting the bridge in a perpendicular orientation in relation to the tremolo block. The tremolo block is received by a compartment of the body of the guitar. It is within the scope of this invention for the novel bridge to have a headless design whereby, there are build in tuners and/or a multiscale design in which the bridge base range is approximately 1.5 inches with the capability to transfer from one body of a guitar to another body of a guitar.

The removable bridge of the guitar has at least one slider removable connected thereto. The slider has a cylindrical wall surface located opposite a substantially planar surface. The substantially planar surface of the slider is removably connected to at least one recess of the first side of the bridge. The slider has an insert received by a chamber. The insert slider holds the ball end of the string and the knob on the back pulls the string tighter to allow tuning. The chamber received an end of at least one string. The substantially planar surface of the slider has a first opening configured to receive a first fastener. The cylindrical wall surface of the slider has a second opening configured to receive a second fastener. It is within the scope of this invention for the intonation sliders to have a 1.5 inch range allowing a FAN fret and/or a multi-scale of up to 3 inches.

In a preferred embodiment, the capturing structure of the removable neck has a guide ramp having an angle of 25 degrees. It is within the scope of this invention for the guide ramp to have an angle range between approximately 1 degree to 89 degrees or curved and/or radiused. This guide ramp results in the release of tension of the guitar strings during the neck removal process from the body recess. It is within the scope of this invention for the sloped wall of the recess of the body of the guitar having an angle range between approximately of 2 degrees to 89 degrees. The capturing structure of the neck of the guitar can have a guide ramp having an angle range between approximately 1 degree and 88 degrees. In a preferred embodiment, it is within the scope of this invention for the sloped wall of the recess of the body of the guitar having an angle range between approximately of 2 degrees and 88 degrees with the capturing structure of the removable neck having a guide ramp having an angle between 1 degree and 89 degrees.

It is within the scope of this invention for the sloped wall of the recess of the body of the guitar to have an angle range between 1 degree and 89 degrees. It is within the scope of this invention for the sloped wall of the recess of the body of the guitar to have a range between approximately 5 degrees and 20 degrees. This angle allows for clearance between the guide ramp of the capturing structure of the removable neck and the sloped wall of the recess of the body of the guitar during installation and removal of the capturing structure from the recess.

It is within the scope of this current invention for a removable capo to be connected to the bridge. In particular, the capo will retain the strings in a desired orientation on the bridge.

In a third embodiment, a guitar has a body. The body of the guitar has a recess. The recess retains a locking mechanism. The locking mechanism has a lever. The lever has a latching structure. The latching structure has a tooth located perpendicular to the latching structure, the guitar has at least one string. The guitar has a removable neck having a fretboard. The fretboard has a primary side located opposite a secondary side. At least one string is located on the primary side of the fretboard. The removable neck of the guitar has an end having a capturing structure. The capturing structure is connected to the secondary side of the fretboard. The fretboard protrudes beyond the outer perimeter edge of the capturing structure. The capturing structure has a guide ramp. The capturing structure has a locking plate. The locking plate has an opening. The opening of the locking plate of the capturing structure is engaged by the tooth of the latching structure when the capturing structure is received by the recess of the body of the guitar. The locking mechanism is retained within the recess of the body of the guitar, whereby, the recess of the body of the guitar retains the capturing structure of the removable neck when the locking mechanism is engaged.

It is within the scope of this invention for the first embodiment to include the removable neck having a capturing structure being received by a recess of the body of the guitar body. The removable neck may be installed onto the body of the guitar with a fastener and a tool including, but not limited to, a screw and a screw driver respectively.

It is within the scope of this invention for the second embodiment to include the removable neck being installed onto the body of the guitar with an electromechanical fastening mechanism including, a motor, a power source, a self-resetting circuit breaker or a non self-resetting circuit breaker and/or a thermal limiting switch, a double pole double throw relay and/or switch having two inputs and four outputs and/or a non-double pole double throw relay and/or switch. It is within the scope of this invention for the switch to include, but not be limited to, a toggle switch, a rocker switch, a single push button, and/or a double pole double throw momentary push button switch wired with a rotary limit switch. The electromechanical fastening means eliminates the need for a user to use a tool when installing and removing the fastener from the removable neck and the body of the guitar. It is within the scope of this invention for a double pole double throw relay and/or switch and/or any reversing polarity circuitry can be used to control the direction the fastener is rotated. For example, when the switch is actuated in a first direction, the motor rotates in a first direction, which in turn drives the belt in a first direction, which rotates the nut and/or fastener in a first direction, whereby, the fastener is installed through the nut which is located in the body of the guitar and through the cam locking fastener located in the capturing structure of the removable neck. In another example, when the switch, such as a toggle switch or a rocker switch is actuated in a second direction, the motor rotates in a second direction, which in turn drives the belt in a second direction, which rotates the nut and/or fastener in a second direction, whereby, the fastener is removed from the cam locking nut located in the capturing structure of the removable neck and removed from the nut located in the body of the guitar.

It is within the scope of this invention for the third embodiment to include the removable neck having a capturing structure with a locking plate configured to engage a locking mechanism of the body of the guitar. This locking mechanism eliminates the need for a fastener to secure the removable neck to the body of the guitar during installation.

It is within the scope of all of the embodiments including, the first embodiment, the second embodiment, and the third embodiment for a removable bridge to be removably connected to fasteners connected to the body of the guitar and/or connected to fasteners connected to a tremolo block of the guitar. Further, removable bridge may be designed (FIGS. 37-40) to eliminate the need for individual sliders with a single removable plate having a plurality of openings. The guitar has a removable bridge connected thereto. The removable bridge can have a first side located opposite a second side. The first side of the bridge has a first opening bordering a bore. The bore is connected to a guide ramp on the top surface of the bridge. The top surface of the bridge has a second opening bordering a chamber. The chamber receives at least a portion of a removable plate. The removable plate has at least one opening. In a preferred embodiment, the removable plate has a plurality of openings configured to receive and support guitar strings. The plurality of openings of the removable plate are not retained within the chamber of the bridge. The plurality of openings of the removable plate are located on the portion of the removable plate that protrudes from the chamber of the bridge. At least one string of the enters through the first opening of the first side of the bridge, traverses through the bore, exits the bore through another opening and is then guided along the top surface of the bridge by a guide ramp. The string of the guitar then is received by at least one opening of the removable plate and extends to the head portion of the top portion of the guitar to be secured into place. The ball end of the strung is retained within the first opening of the first side of the bridge.

It is within the scope of all of the embodiments including, the first embodiment, the second embodiment, and/or the third embodiment for a removable bridge to be removably connected to an improved bridge block system for a guitar. A removable bridge block system for a guitar has a guitar with a neck portion and a body portion. The body portion of the guitar has a first opening bordering a first compartment. The first compartment has an inner wall surface. Although not required, in an alternate embodiment, a support structure is connected to at least a portion of the inner wall surface of the first compartment. The support structure is made of four side walls connected together to form a box. A flange extends from the bottom edge of the four side walls of the support structure. This flange of the support structure helps to retain the stepped portion of the bridge block so that the bridge block stays retained within the first compartment of the body of the guitar and does not fall out of the guitar. The bridge block has openings that traverse the length of the bridge block and are configured to each receive a guitar string.

The bridge block has an outer wall surface. The bridge block is retained within the first compartment of the body portion of the guitar. At least a portion of the outer wall surface of the bridge block is connected to the support structure. The bridge block has a recess configured to receive a plate of the locking mechanism. The locking mechanism has a plate. The plate includes a disk having a substantially curved edge and a flat edge. The plate is retained within a second compartment of the body of the guitar. A second opening borders the second compartment. It is within the scope of this invention for the second compartment of the body of the guitar to have a recess receiving the plate. This recess would allow the plate to be flush with the second compartment floor and allow a user's fingers or a tool to enter the second compartment to more easily access the locking plate. The locking mechanism of the improves bridge block system does not protrude from the rear of the guitar because it is set back in at least one recess, pocket, and/or compartment. The first compartment traverses through the entire body of the guitar from the front of the guitar to the back of the guitar. The second compartment is located at the back portion of the body of the guitar. The plate is configured to rotate, with the force of a user's fingers or with a tool such as a screw driver or a hex key, within the second compartment of the body of the guitar to orient the substantially curved edge of the plate to be retained within the recess of the bridge block. When the plate is rotated from the flat edge being parallel to the recess of the bridge block, to the curved edge of the plate entering the recess of the bridge block, the locking mechanism is in a locked orientation. The locking plate is configured to rotate within the second compartment of the body of the guitar to orient the flat edge of the plate to be substantially parallel to the recess of the bridge block to orient the locking mechanism in an unlocked orientation.

It is within the scope of this invention for the support structure to have a first side wall connected to a second side wall. The second side wall is connected to a third side wall. The third side wall is connected to a fourth side wall. The fourth side wall is connected to the first side wall. A flange extends from the bottom edge of the inner wall surface of the first side wall, the second side wall, the third side wall, and the fourth side wall of the support structure. The flange of the support structure prevents the bridge block from sliding through the first compartment when the bridge block is installed into the support structure from the front face of the guitar. The flange catches the step of the bridge block and retains the stepped portion of the bridge block to retain the bridge block within the first compartment of the body of the guitar.

Further, the support structure has at least one opening located on at least one side wall of the first side wall, the second side wall, the third side wall, or the fourth side of said support structure. The opening of the support structure is in alignment with the recess of the bridge block so that the opening of the support structure is large enough to receive at least a portion of the curved portion of the plate when the locking mechanism is oriented in a locked orientation and so that the recess of the bridge block is large enough to receive at least a portion of the curved portion of the plate when the locking mechanism is oriented in a locked orientation. The bridge block has a first portion and a stepped portion. A step separates the first portion of the bridge block from the stepped portion of the bridge block. The first portion of the bridge block has a greater perimeter than the perimeter of the stepped portion. This allows the stepped portion of the bridge block to be retained by the flange of the support structure. The step connects with an inner wall surface of the flange of the support structure while the stepped portion is hugged or retained by or surrounded by edge of the flange.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
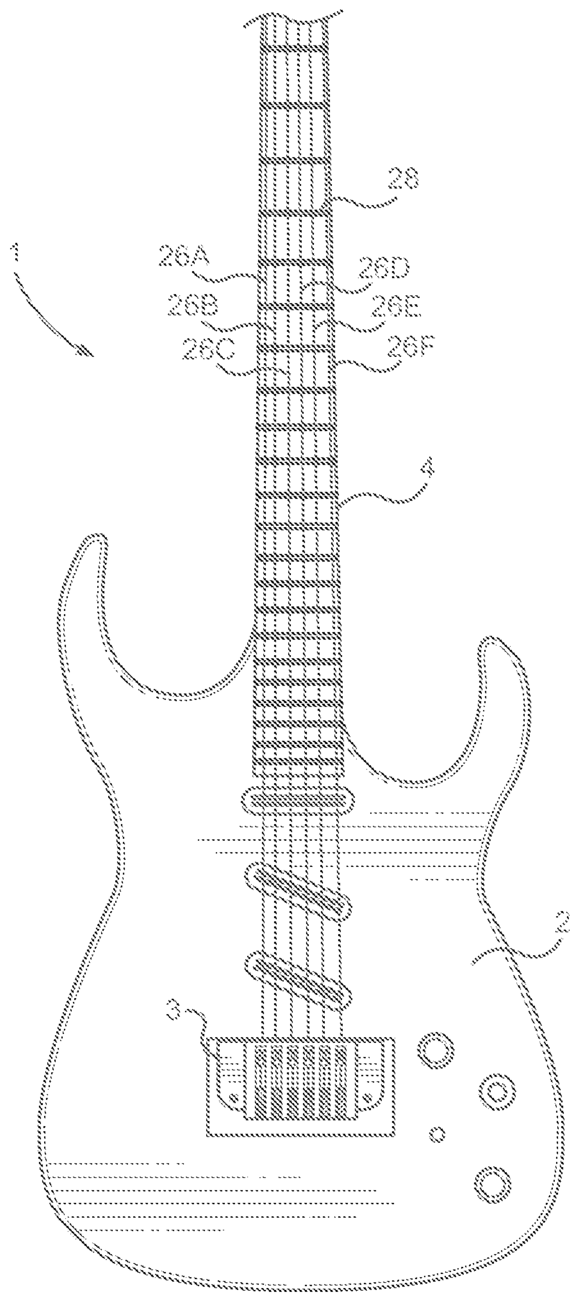
FIG. 1 is a top plan view of the novel guitar having a removable neck and bridge.
Figure 2:
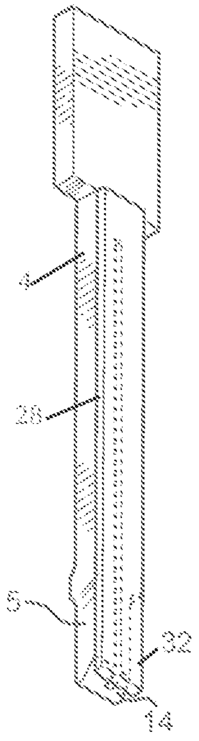
FIG. 2 is a perspective view of the novel removable neck having a capturing structure and a guide ramp.
Figure 7A:
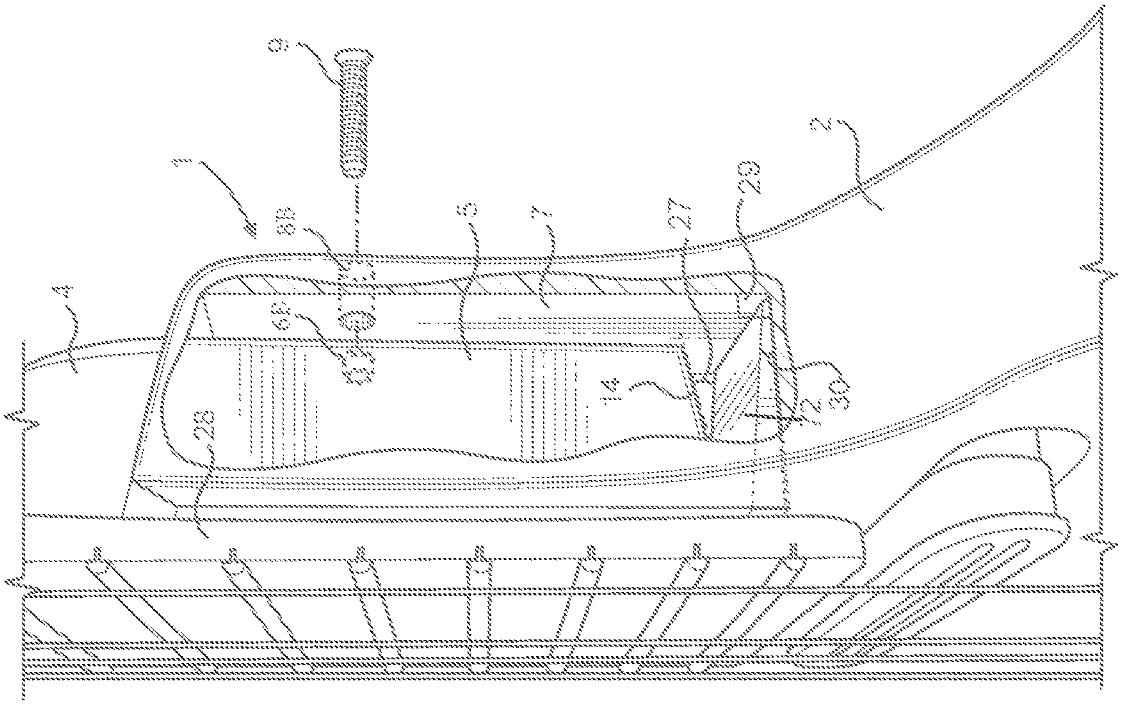
FIG. 7A is a sectional view of the recess of the body of the guitar receiving the capturing structure of the removable neck, the recess having an angled wall and a second opening.
Figure 7C:
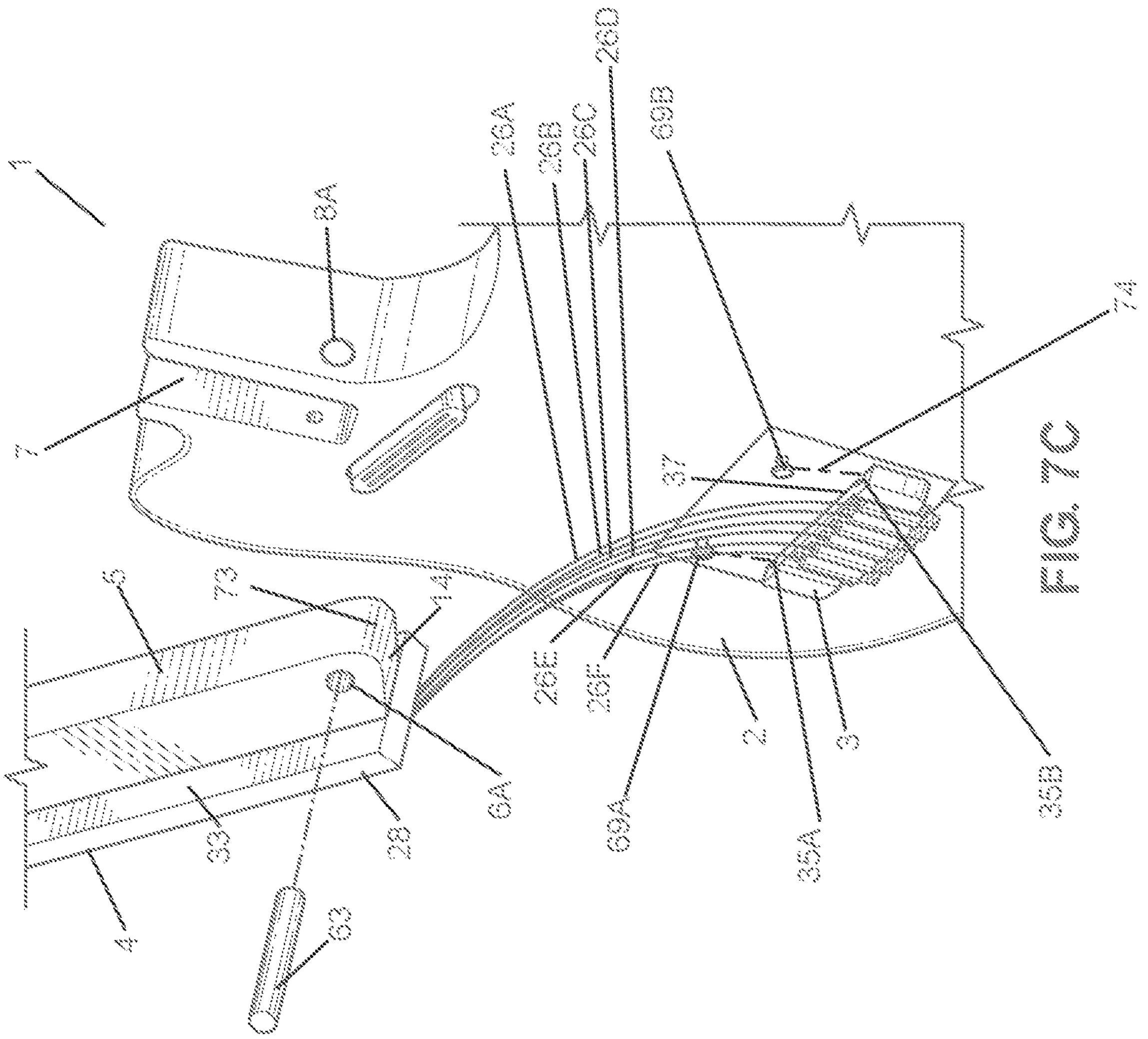
FIG. 7C is an exploded view of a first alternate embodiment of the novel removable neck and capturing structure having a radiused guide ramp being hingedly pivotable at a hinge pin being a fulcrum point within the recess of the body of the guitar.
Figure 8:
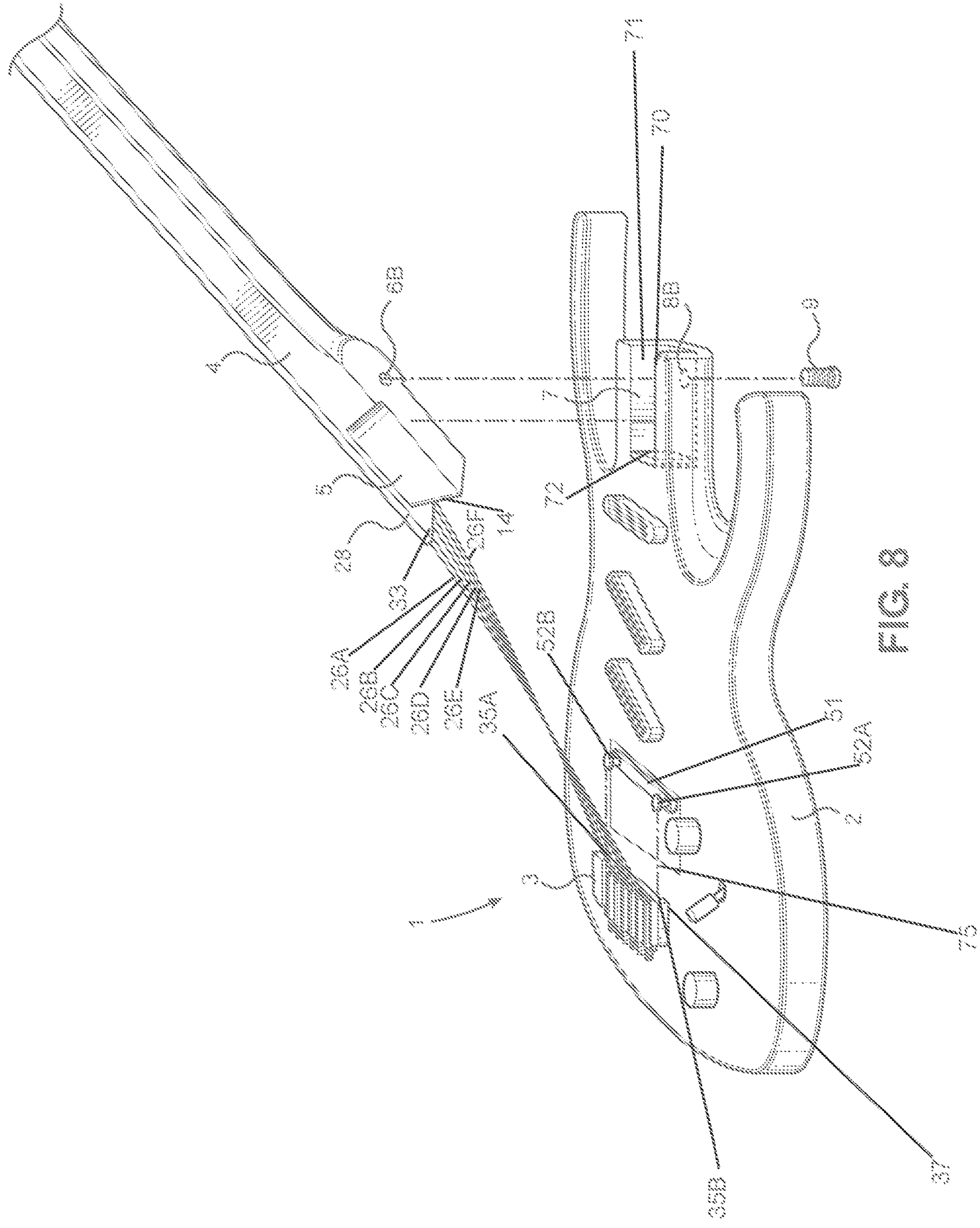
FIG. 8 is an exploded view of the recess of the body of the guitar receiving the capturing structure of the removable neck having a second opening, the recess has an angled wall and a second opening, a fastener is received by the second opening of the recess and the second opening of the capturing structure.

Referring now to FIG. 1 is a first embodiment of interchangeable neck 4 and bridge 3 components for guitar 1. Guitar 1 has body 2. FIG. 7C best shows body 2 of guitar 1 has removable bridge 3 connected to at least a portion of body 2 including, but not limited to, fasteners 69A and 69B or to at least a portion of tremolo block 51 (FIG. 8). Although the embodiment of FIG. 7C illustrates that removable bridge 3 is connected to fasteners 69A and 69B, it is within the scope of this invention for removable bridge 3 to be connected to at least a portion of tremolo block 51, including, but not limited to, bushings 52A and 52B (FIG.

8). Guitar 1 has at least one string. In particular, guitar 1 can have bridge 3 connected to a plurality of strings 26A-26F (FIG. 1). Interchangeable neck 4 has fretboard 28.

Figure 3:
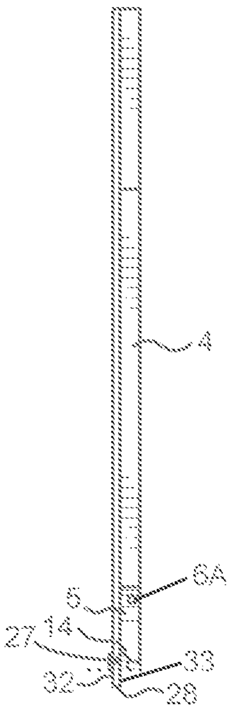
FIG. 3 is a left-side elevational view of the novel removable neck having a capturing structure having a first opening and a guide ramp.
Figure 4:
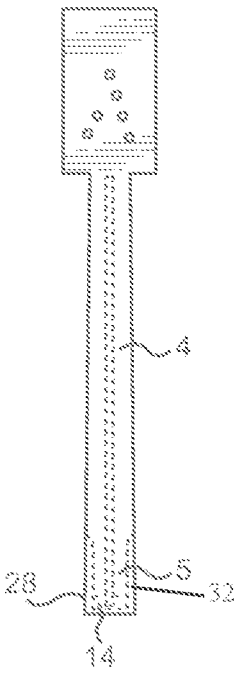
FIG. 4 is a top plan view of the novel removable neck.
Figure 5:
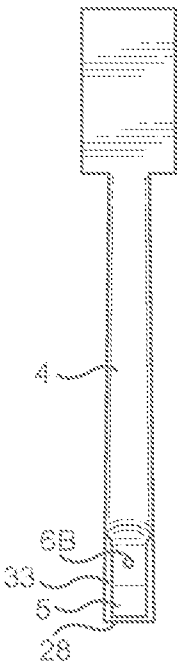
FIG. 5 is a bottom plan view of the novel removable neck and capturing structure having a second opening.

FIGS. 2-5, and 8 illustrate the first embodiment of interchangeable and/or removable neck 4 of FIG. 1. It is within the scope of this current invention for removable neck 4 to include, but not be limited to a, head stock design as shown in FIGS. 2-5 or a headless design as shown in FIGS. 1 and 8. Removable neck 4 has fretboard 28 (FIGS. 1-5, 7A, 7B, 7C, 8). Fretboard 28 has primary side 32 (FIGS. 2, 3, and 4) located opposite secondary side 33 (FIGS. 3, 5, 7B, 7C, and 8). At least one string 26A-26F (FIGS. 1, 7C, and 8) is located on primary side 32 of 28 fretboard. Removable neck 4 has an end having capturing structure 5 (FIGS. 2-5). Capturing structure 5 is connected to secondary side 33 of fretboard 28. Capturing structure 5 has a sloped portion being guide ramp 14 (FIGS. 2-4, and 7A) that meets secondary side 33 of fretboard 28, forming angle 27 (FIGS. 3 and 7A). It is within the scope of this invention for angle 27 to be approximately 25 degrees. FIG. 3 shows capturing structure 5 of removable neck 4 having first opening 6A and/or capturing structure has secondary opening 6B (FIG. 5). It is within the scope of this invention for an opening to be located on any surface of capturing structure 5 including at least one, but not limited to, the left side, the right side, or the side located opposite fretboard 28.

Figure 7B:
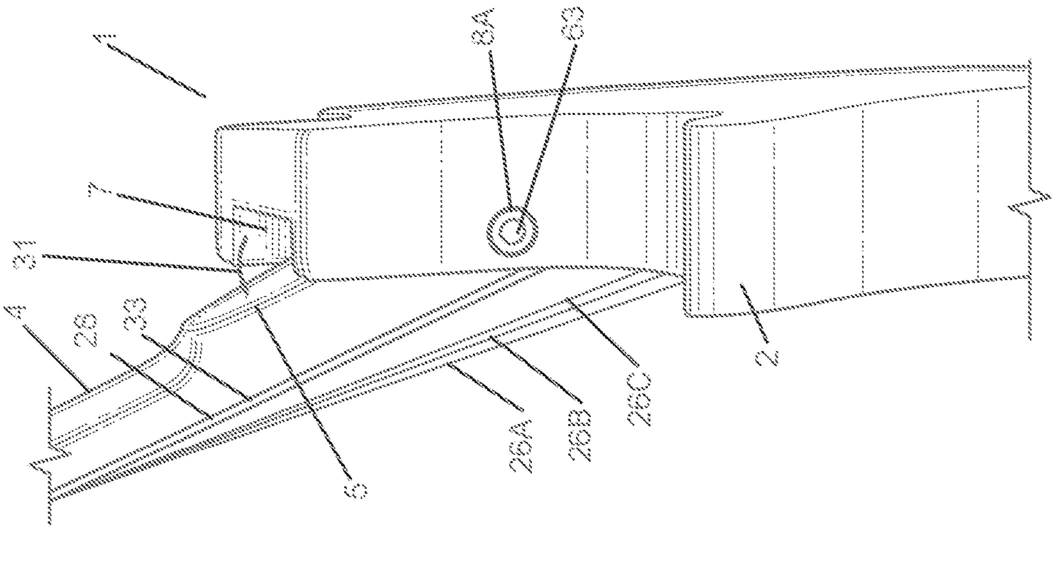
FIG. 7B is a perspective view of a first alternate embodiment of the novel removable neck and capturing structure being hingedly pivotable at a hinge pin being a fulcrum point within the recess of the body of the guitar.

It is within the scope of this invention for the first, second, and third embodiments to include fretboard 28 protruding beyond the outer perimeter edge of capturing structure 5. Capturing structure 5 has at least one bore or opening 6A (FIG. 3) and 6B (FIG. 5). The opening 6A-6B receives fastener. It is within the scope of this invention for the fastener to include, but not be limited to, screw 9 (FIG. 7A) or hinge pin 63 (FIGS. 7B-7C). As shown in FIG. 7B, hinge pin 63 allows removable neck 4 to be hingedly pivotable within recess 7 of body 2 of guitar 1.

Figure 6:
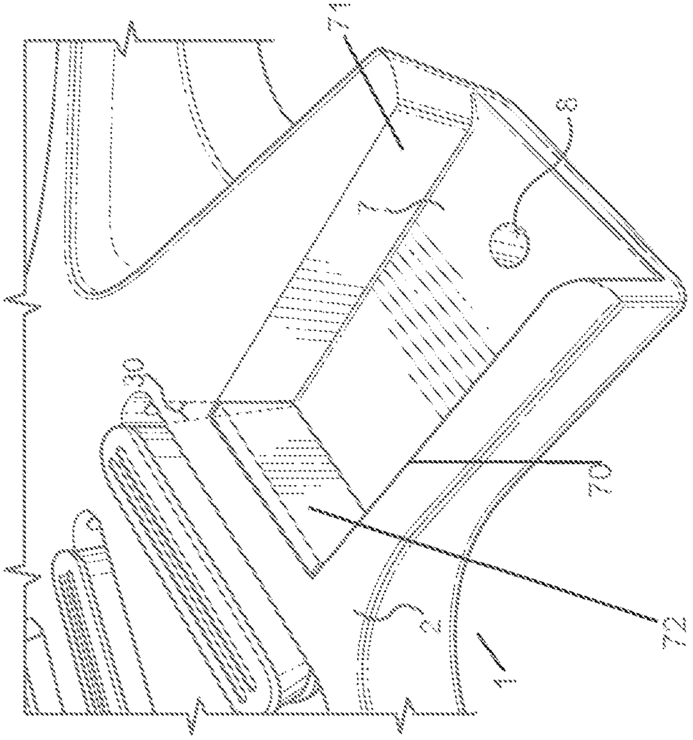
FIG. 6 is a perspective view of the recess of the body of the guitar, the recess having an angled wall and a second opening.

FIGS. 7A and 8 illustrate the first embodiment of secondary bore 6B of capturing structure 5 of removable neck 4 is aligned with secondary bore 8B (FIG. 6, 7A, 8) of recess 7 of body 2 of guitar 1 when capturing structure 5 of removable neck 4 of guitar 1 is received by recess 7 of body 2 of guitar 1. Recess has 90-degree angle 29 (FIG. 7A). Removable neck 4 of guitar 1 is secured to body 2 of guitar 1 when secondary bore 8B of recess 7 of body 2 of guitar 1 and secondary bore 6B of capturing structure 5 receives fastener 9. It is within the scope of this invention for fastener 9 to include, but not be limited to, a screw. Body 2 of guitar 1 has recess 7. As best shown in FIGS. 6 and 8, recess 7 of body 2 of guitar 1 has two parallel side walls being first side wall 70 and second side wall 71. A sloped wall 72 (FIGS. 6, 7A, and 8) of recess 7 is located between two parallel side walls 70 and 71. Sloped wall 72 of recess 7 has an angle range 30 (FIGS. 6 and 7A) between approximately of 65 degrees and 85 degrees. Guide ramp 14 of capturing structure 5 has an angle range 27 (FIGS. 3 and 7A) between approximately 5 degrees and 25 degrees.

FIGS. 7C and 7B depict the first embodiment of removable neck 4 having capturing structure 5 with primary opening 6A (FIG. 7C). Body 2 of guitar 1 has recess 7 having primary bore 8A of recess 7. Capturing structure 5 of FIGS. 7B and 7C have guide ramp 14 having a radiused 73 (FIG. 7C) or curved portion, which helps removable neck 4 to hingedly pivot 31 (FIG. 7B) on hinge pin 63. Strings 26A-26C are shown in FIG. 7B and strings 26A-26F are connected to bridge 3 as illustrated in FIGS. 7C and 8. FIGS. 7C and 8 best show second side 37 of bridge 3 having first flange 40A (FIG. 11) and second flange 40B (FIG. 11) of first recess 35A and second recess 35B removably connected to 74 (FIG. 7C) fasteners 69A and 69B (FIG. 7C) of body 2 of guitar 1. It is also within the scope of this invention for bridge 3 having first flange 40A (FIG. 11) and second flange 40B (FIG. 11) of first recess 35A and second recess 35B removably connected to 75 (FIG. 8) fasteners and/or bushings 52A and 52B (FIG. 8) of tremolo block 51 of guitar 1.

Figure 9:
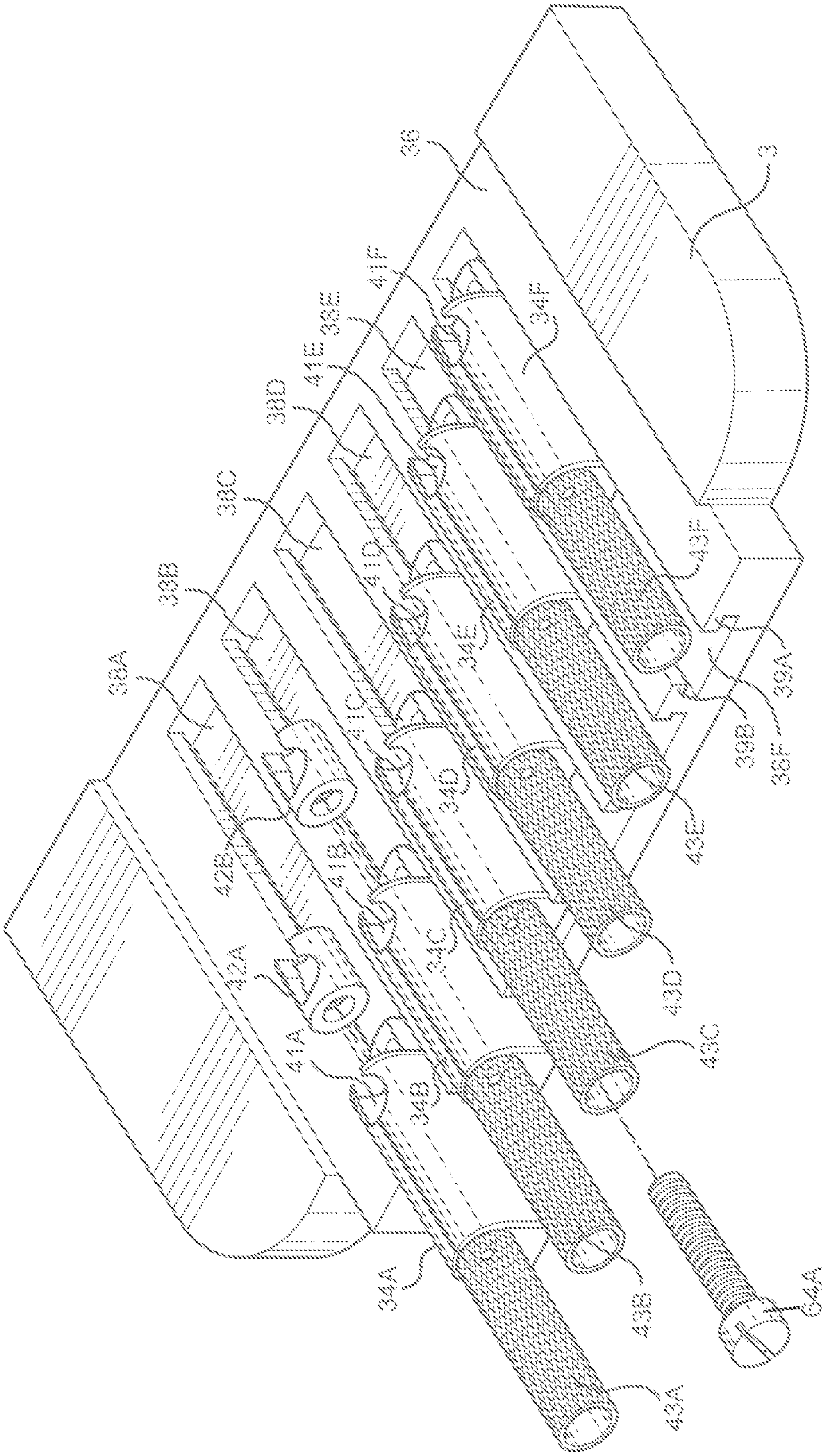
FIG. 9 is an exploded view of the bridge having a plurality of recesses that each receive a slider having an insert, a knob, a fastener, and a string.
Figure 10:
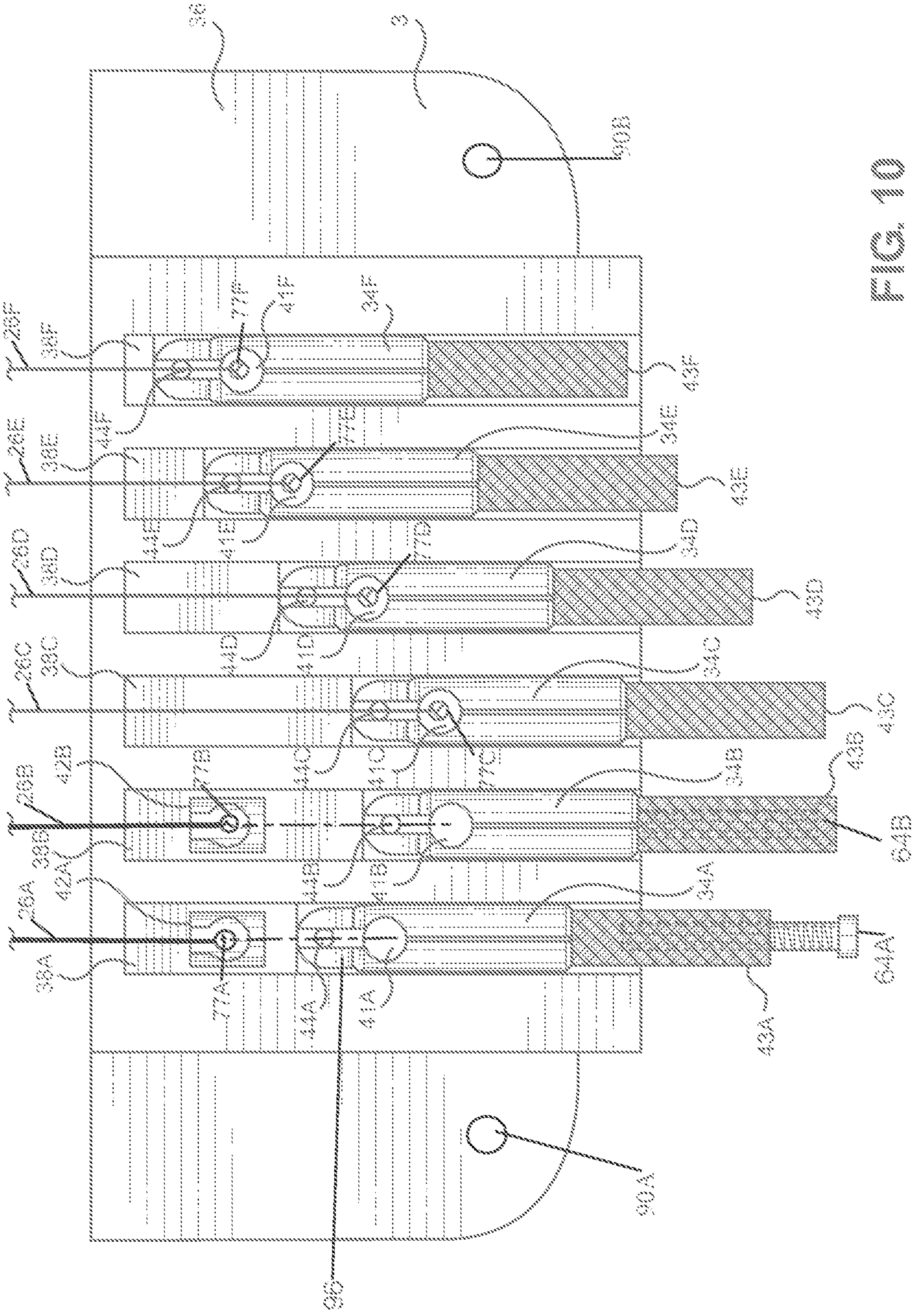
FIG. 10 is a top plan view of the bridge having a plurality of recesses that each receive a slider having an insert, a knob, a fastener, and a string.
Figure 11:
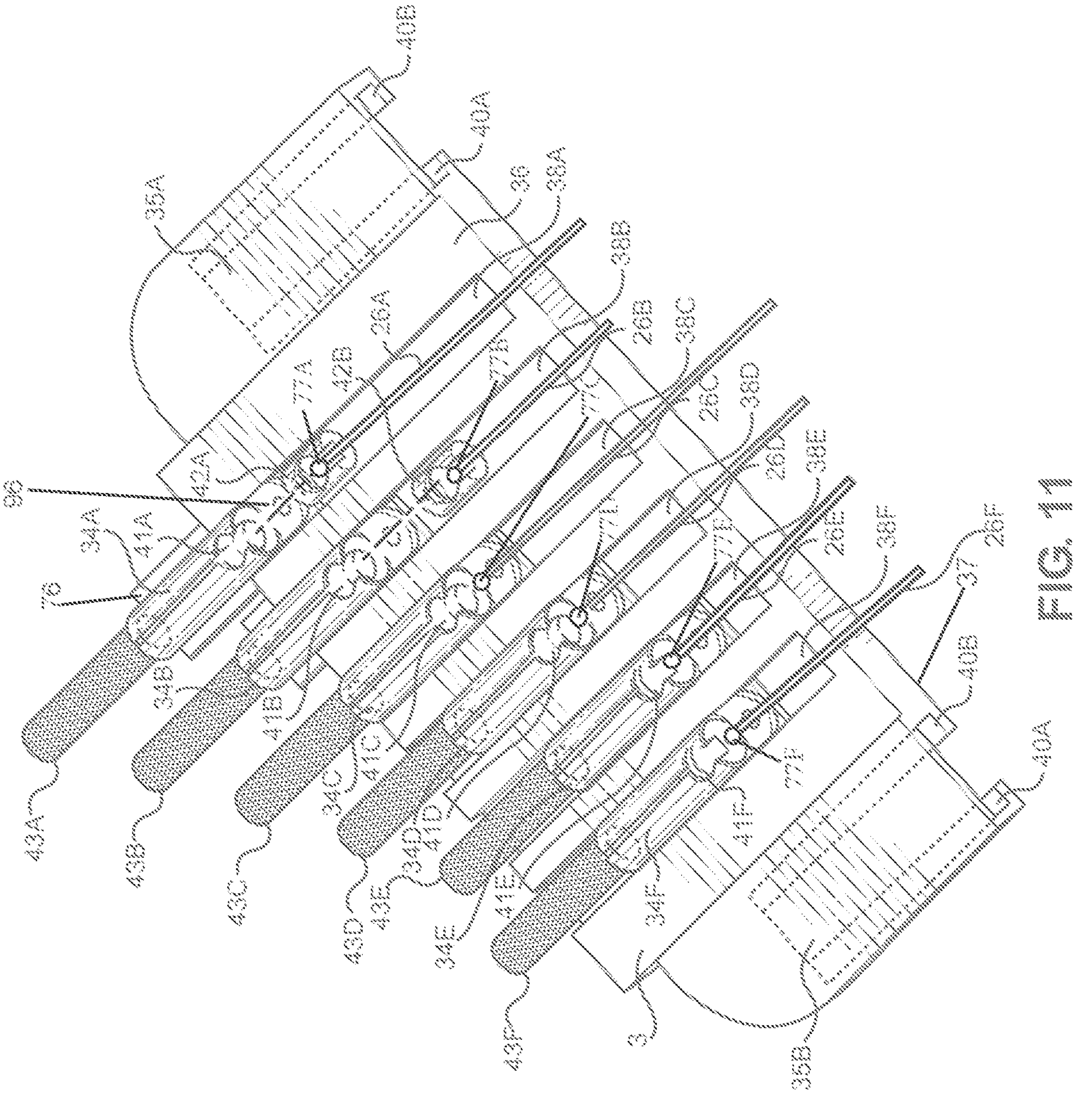
FIG. 11 is a sectional view of the bridge having a first side having a plurality of recesses that each receive a slider having an insert, a knob, a fastener, and a string located opposite a second side having a plurality of recesses configured to connect to the body of a guitar.
Figure 12:
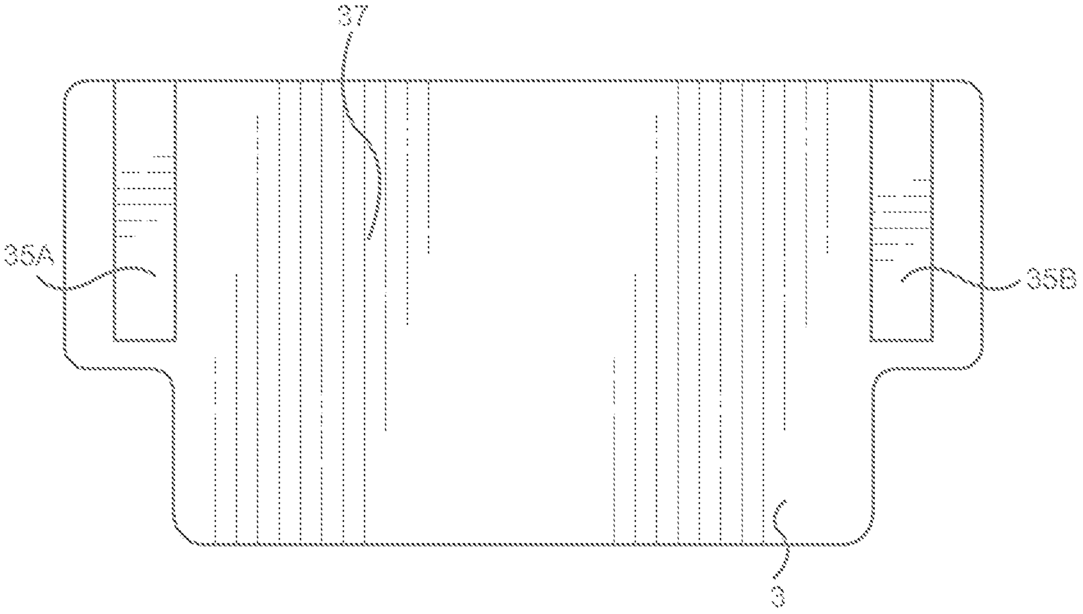
FIG. 12 is a bottom plan view of the second side of the bridge having a plurality of recesses configured to connect to the body of a guitar.

FIGS. 9-11 illustrate removable bridge 3 of the first, second, and third embodiment. Removable bridge 3 has first side 36 located opposite second side 37 (FIGS. 11 and 12). First side 36 of bridge 3 has at least one recess 38A-38F. At least one recess 38A-38F of first side 36 of bridge 3 has at least one flange 39A and 39B (FIG. 9). In a preferred embodiment, it is more desirable for each recess 38A-38F to have a first flange 39A and a second flange 39B. A plurality of recesses 38A-38F of first side 36 of bridge 3 each receives slider 34A-34F respectively. It is a preferred embodiment for sliders 34A-34F to have a protruding lip 76 (FIGS. 11 and 13A-13C) to engage first flange 39A and second flange 39B of recesses 38A-38F.

FIGS. 7C, 8, 11 and 12 show second side 37 of said bridge 3 having first recess 35A and second recess 35B. FIG. 11 best illustrates recess 35A and second recess 35B of second side 37 of bridge 3 having first flange 40A and second flange 40B. First flange 40A and second flange 40B are removably connected to at least a portion of guitar 1.

Figure 13A:
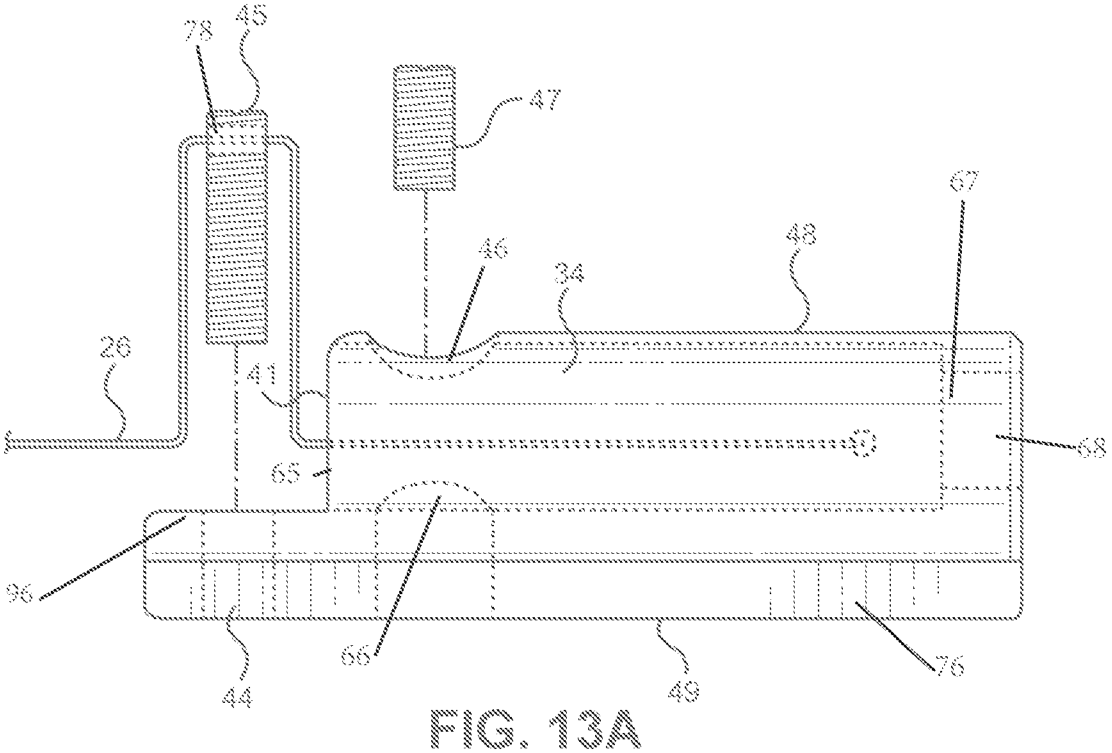
FIG. 13A is an exploded side view of a first embodiment of a slider of the bridge having a first fastener with an opening receiving a string, a second fastener, a first slider opening, a second opening, a third opening, a fourth opening, and a fifth opening connected to a knob.

Referring again to FIGS. 9-11, removable bridge 3 has a plurality of sliders 34A-34F. As best shown in FIG. 13A, slider 34 has cylindrical wall surface 48 located opposite substantially planar surface 49. Substantially planar surface of slider 34 has protruding lip 76. Sliders 34A-34F each have insert 42A (FIGS. 9-11), 42B (FIGS. 9-11) received by chamber 41A-41F of sliders 34A-34F. Chambers 41A-41F of sliders 34A-34F receive ball end 77A-77F (FIGS. 10 and 11) of strings 26A-26F (FIGS. 10 and 11). FIG. 9 shows plurality of knobs 43A-43F connected to an end of plurality of sliders 34A-34F respectively. An end portion of plurality of knobs 43A-43F (FIGS. 9-11) receives fastener 64A (FIGS. 9 and 10) and 64B (FIG. 10). 44A-44F (FIG. 10) illustrates first opening of sliders 34A-34F. FIG. 10 illustrates first side 36 of bridge 3 having openings 90A and 90B configured to receive at least a portion of a whammy bar (not shown). It is within the scope of this invention for bridge 3 of all embodiments and all FIGS. to have first side 36 of bridge 3 having openings 90A and 90B configured to receive at least a portion of a whammy bar.

Figure 14:
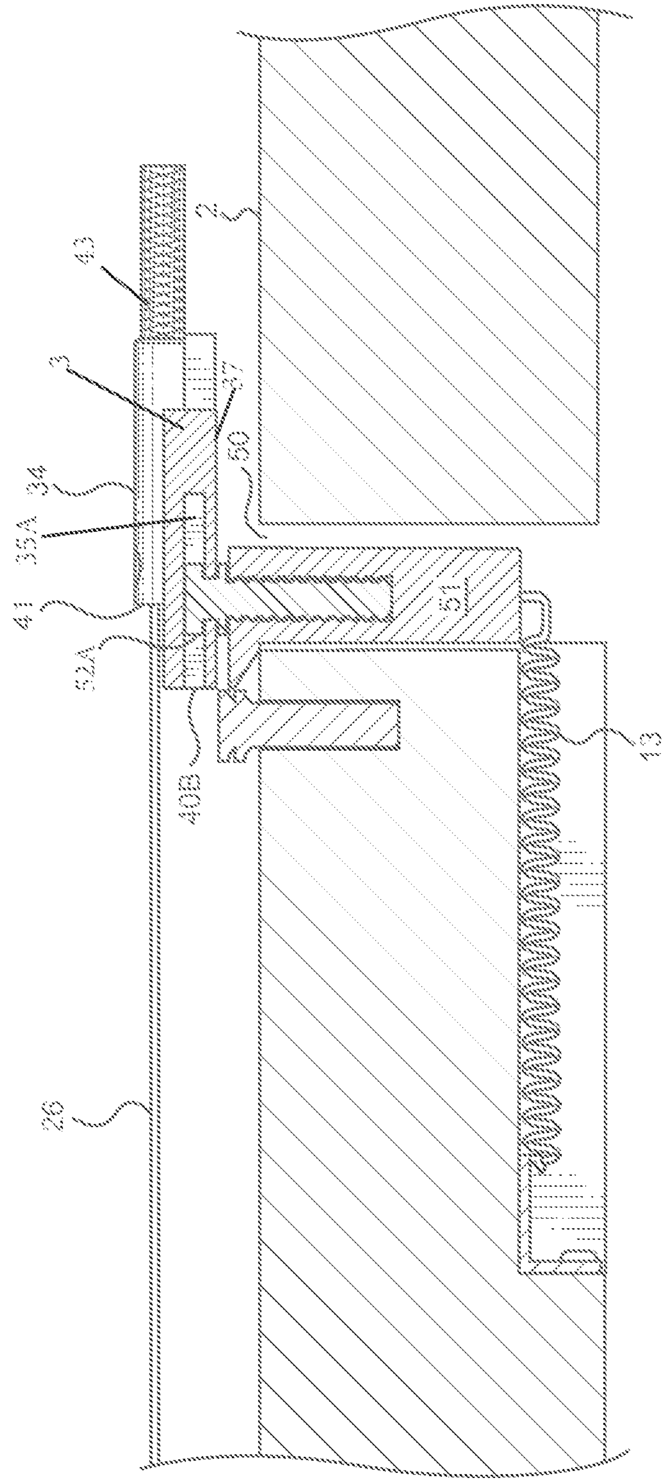
FIG. 14 is a sectional view of the body of the guitar having a compartment receiving the tremolo block connected to the bridge.

Referring now to FIG. 13A, this first embodiment of slider 34 is also shown in FIGS. 9-11. Slider 34 has substantially planar surface 49 of slider 34 has first opening 44 configured to receive first fastener 45. First fastener 45 has opening 78. Opening 78 of first fastener 45 receives string 26 (FIGS. 13A and 14). String 26 enters chamber 41 (FIGS. 13A and 14) of slider 34 through third opening 65 of slider 34 and is oriented over second fastener 47 when second fastener 47 is installed in slider 34. Each slider has set screw 47 to hold intonation and screw 45 is configured to set string height. Cylindrical wall surface 48 of slider 34 has second opening 46 located opposite fourth opening 66 that both receive second fastener 47. Slider 34 has third opening 65 located opposite fifth opening 67. Slider 34 has chamber 41 that receives string 26. Central bore 68 connects chamber 41 of slider 34 to knob 43 (FIGS. 11 and 14). The insert holds the ball end of the string and there is a screw 64 (FIG. 10) in the back of slider 34. The tuner knob has the other side of the threaded screw and when turned, pulls the insert back. It is within the scope of the embodiment of FIGS. 1, 7C, 8, 9, 10, 11, and 13A for slider 34 to have third opening 65 to not abut outer perimeter edge 95 of protrusion 96 (FIGS. 10 and 11) of slider 34. This embodiment allows for protrusion 96 of slider 34 to not be located within chamber 41 of slider 34.

Figure 13B:
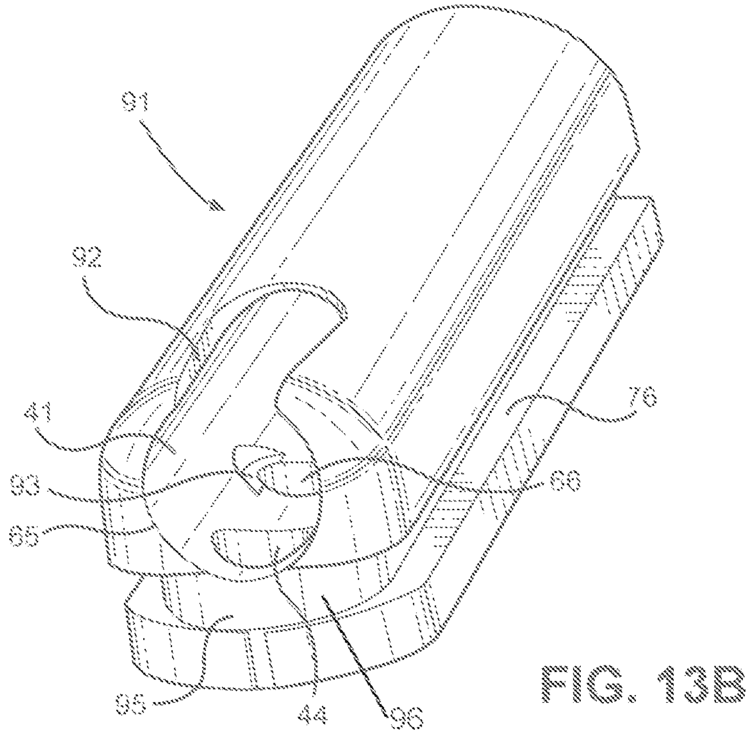
FIG. 13B is a perspective view of an alternate embodiment of a slider having a tapered opening extending over a protrusion portion of the slider so that the protrusion portion is fully retained within and/or under the chamber of the slider.
Figure 13C:
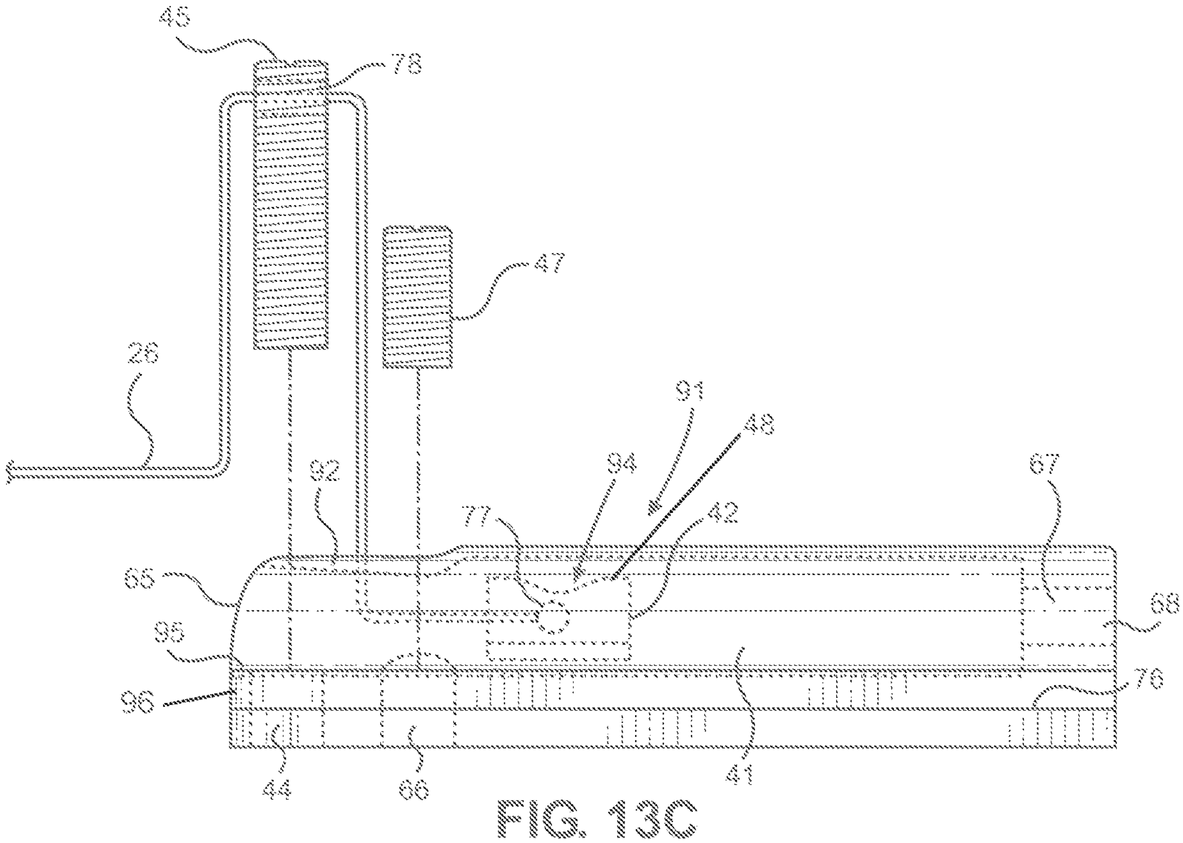
FIG. 13C is a left side sectional view of an alternate embodiment of a slider having a tapered opening extending over a protrusion portion of the slider having a first fastener aligning with both tapered opening and first opening of the slider and a second fastener aligning with both tapered opening and fourth opening of the slider.
Figure 13D:
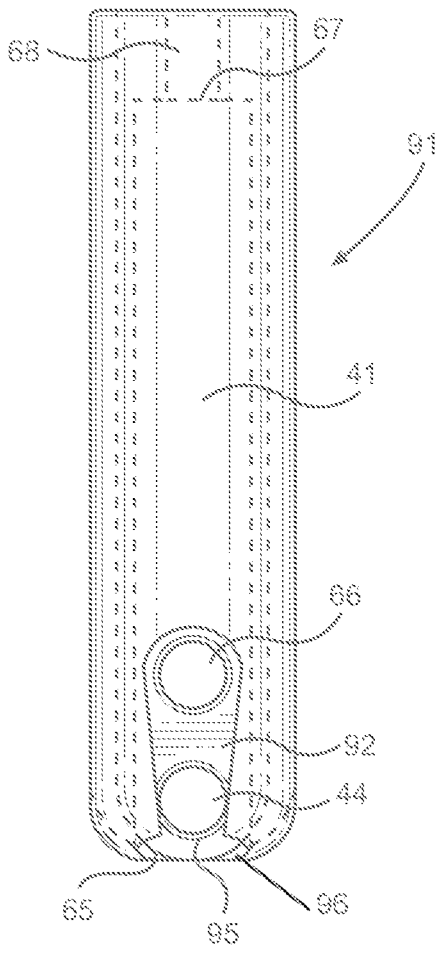
FIG. 13D is a top sectional view of an alternate embodiment of a slider having a tapered opening extending over a protrusion portion of the slider so that the protrusion portion is fully retained within and/or under the chamber of the slider.

In an alternate embodiment of the slider 34 of FIGS. 1, 7C, 8, 9, 10, 11, and 13A, slider 91 is introduced. FIGS. 13B-13D illustrate slider 91 having tapered opening 92 extending over protrusion 96 of slider 91 in embodiments of FIGS. 1, 7C, 8, 9, 10, 11, and 13A so that protrusion 96 is fully retained within and/or under chamber 41 of slider 91. Third opening 65 abuts outer perimeter edge 95 of slider 91. Third opening 65 is oriented perpendicular to tapered opening 92. Slider 91 has tapered opening 92 extending over protrusion portion 96 of slider 91 having first fastener 45 (FIG. 13C) having opening 78 (FIG. 13C) aligning with both tapered opening 92 and first opening 44 of slider 91 and second fastener 47 (FIG. 13C) aligning with both tapered opening 92 and fourth opening 66 of slider 91. FIG. 13C shows string 26 going through opening 78 of first fastener 45. String 26 (FIG. 13C) enters chamber 41 of slider 91.

Insert 42 (FIG. 13C) is the same insert 42 of the embodiments in FIGS. 1, 7C, 8-14, and 19. FIG. 13C shows insert 42 receiving ball end 77 of sting 26. Insert 42 has cylindrical surface portion 48 and recess 94. FIG. 13B shows inner wall surface of chamber 41 of slider 91 having recess 93 bordering fourth opening 66. FIGS. 13C and 13D have fifth opening 67 and central bore 68. FIGS. 13A, 13B and 13C best show protruding lip 76 of slider 91 which engages side walls of recess 38 of bridge 3.

Figure 17:
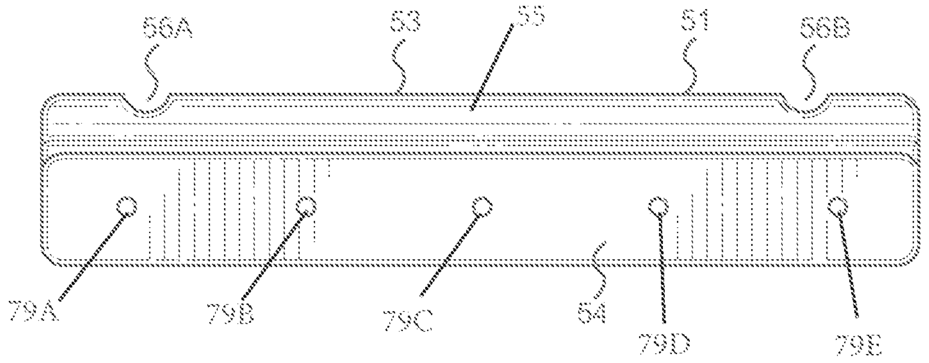
FIG. 17 is a bottom plan view of the tremolo block.
Figure 18:
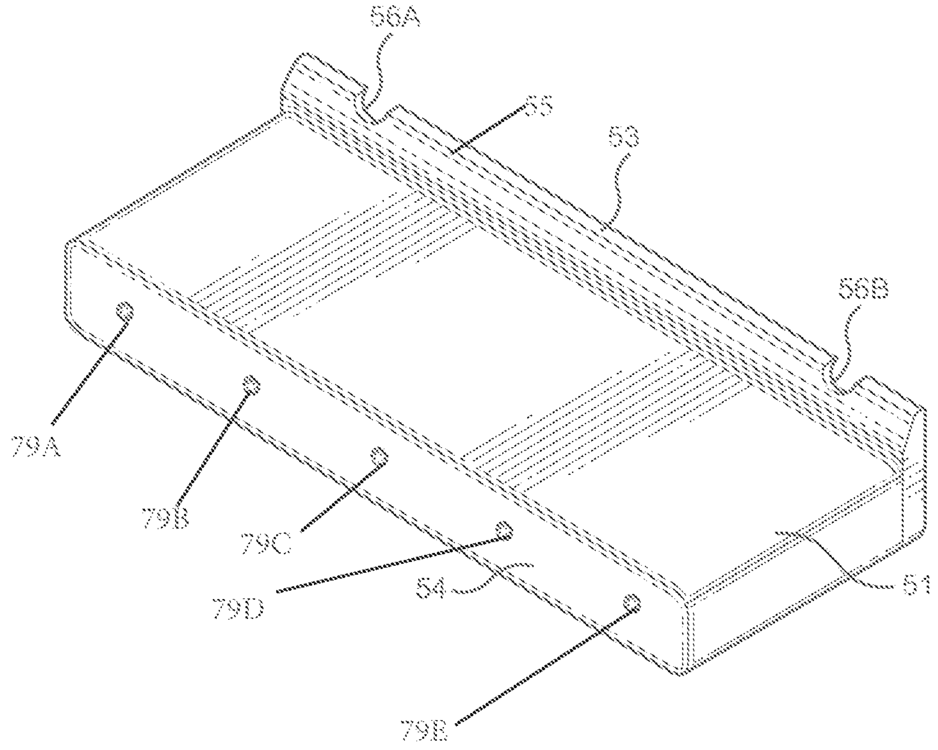
FIG. 18 is a perspective view of the tremolo block.
Figure 19:
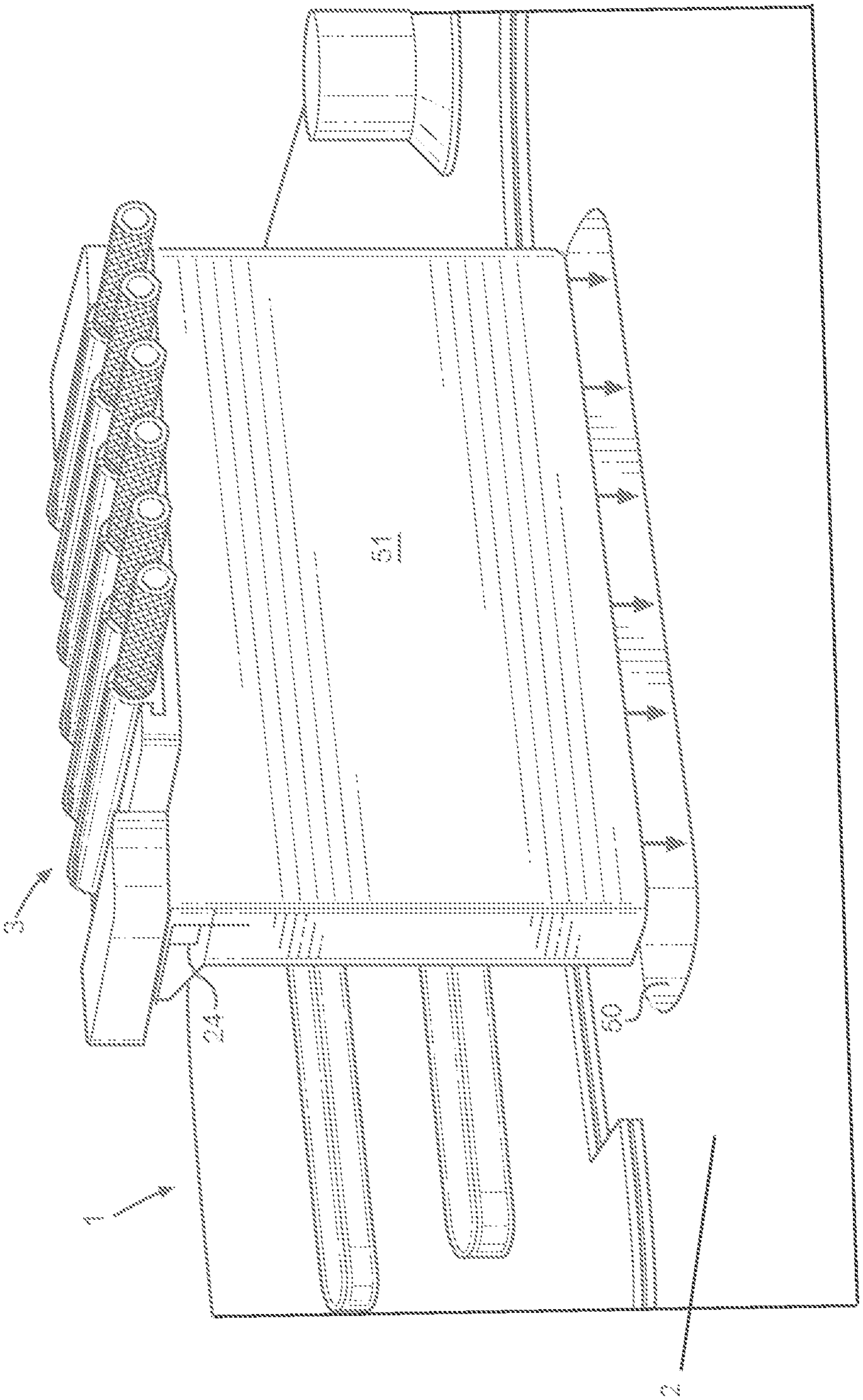
FIG. 19 is an exploded view of the body of the guitar having a compartment receiving the tremolo block connected to the bridge.
Figure 20:
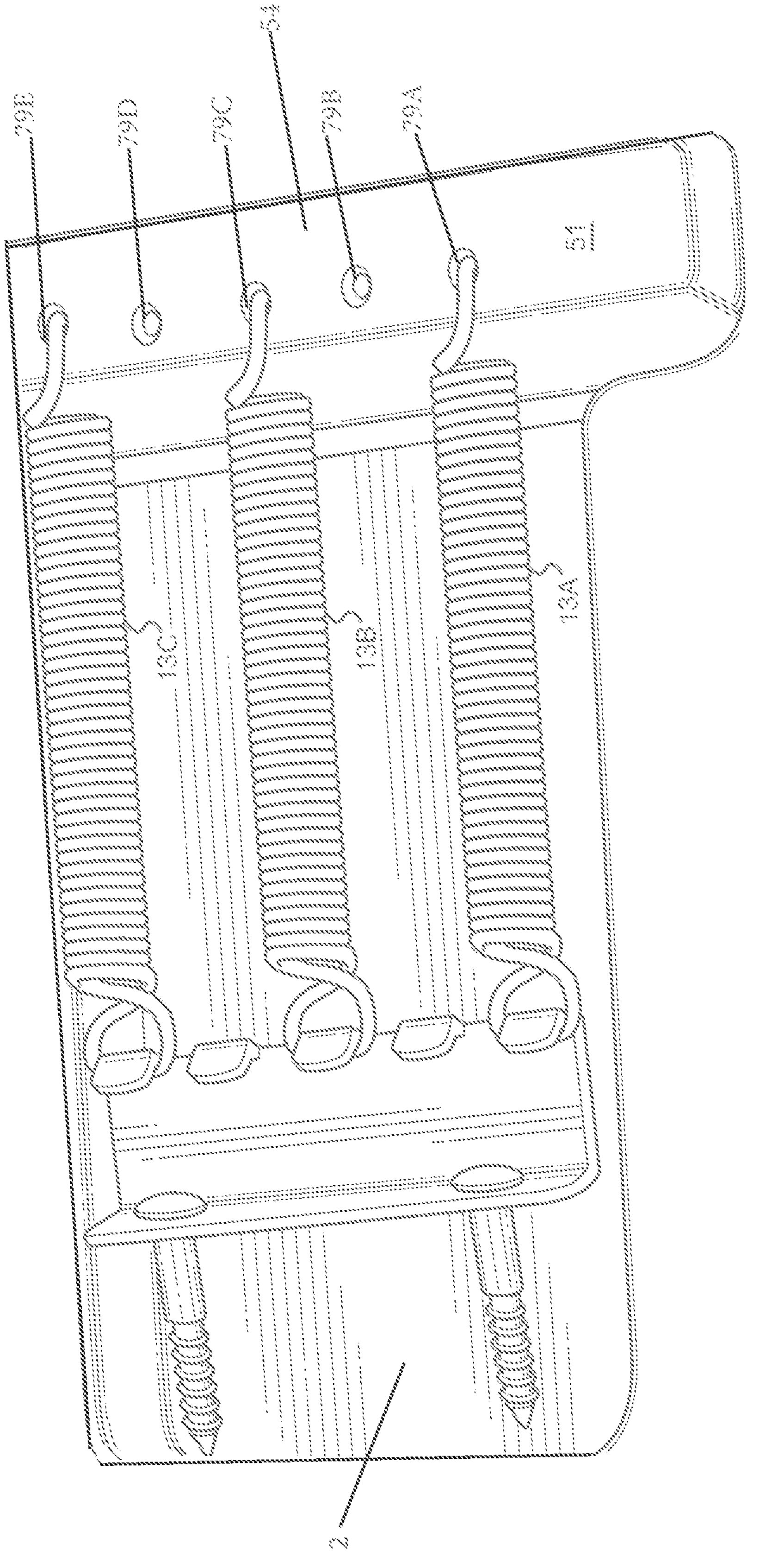
FIG. 20 is a bottom perspective view of the tremolo block having a plurality of openings connected to a plurality of resilient members.

FIGS. 14-20 illustrate an embodiment in which bridge 3 (FIG. 14) is connected to bushings 52A (FIG. 14) and 52B of tremolo block 51 (FIGS. 14-20). FIGS. 14 and 19 show at least a portion of tremolo block 51 is retained within compartment 50 of body 2 of guitar 1. Second side 37 of bridge 3 has recess 35A having first flange 40A (not shown) and second flange 40B (FIG. 14). First flange 40A and second flange 40B are removably connected to bushing 52A of tremolo block 51. An end of tremolo block 51 has a resilient member 13 connected there to. It is within the scope of this invention for resilient member 13 to include, but not be limited to, a spring. Referring now to FIG. 20, secondary side 54 of tremolo block 51 has openings 79A-79E retaining an end of plurality of resilient members 13A-13C.

Figure 15:
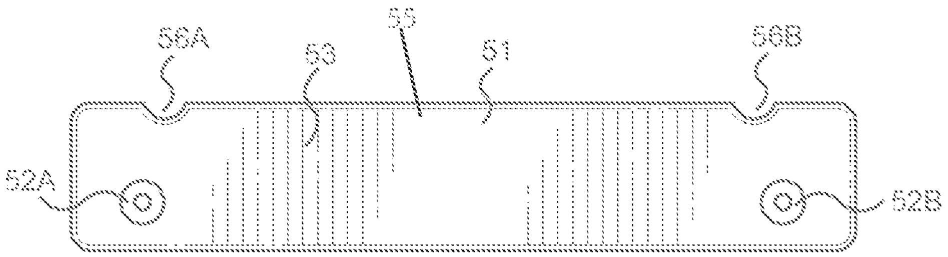
FIG. 15 is a top plan view of the tremolo block having a plurality of bushings connected thereto.
Figure 16:
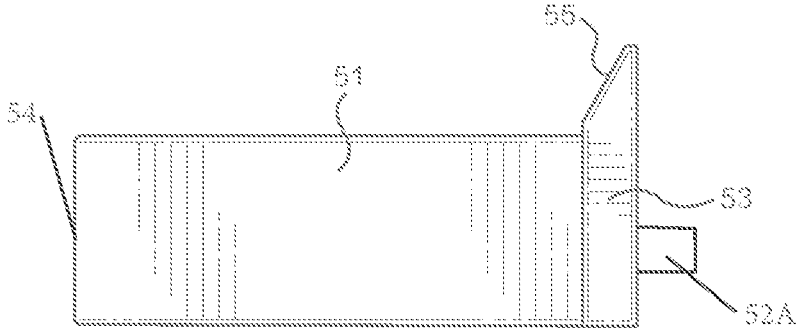
FIG. 16 is a right-side elevational view of the tremolo block.

Referring now to FIG. 15, tremolo block 51 has bushing 52A and bushing 52B protruding from primary end 53 of tremolo block 51. FIGS. 15, 17, and 18 show tremolo block has first recess 56A and 56B located on flange 55 of tremolo block 51. FIGS. 16-18 show tremolo block 51 having primary end 53 located opposite secondary end 54. Flange 55 and at least one bushing 52A (FIGS. 14 and 16) are located on primary end 53 of tremolo block 51. FIGS. 17 and 18 best show tremolo block 51 having plurality of openings 79A-79E. FIG. 19 shows perpendicular 24 angle formed when bridge 3 is connected to tremolo block 51.

Figure 21A:
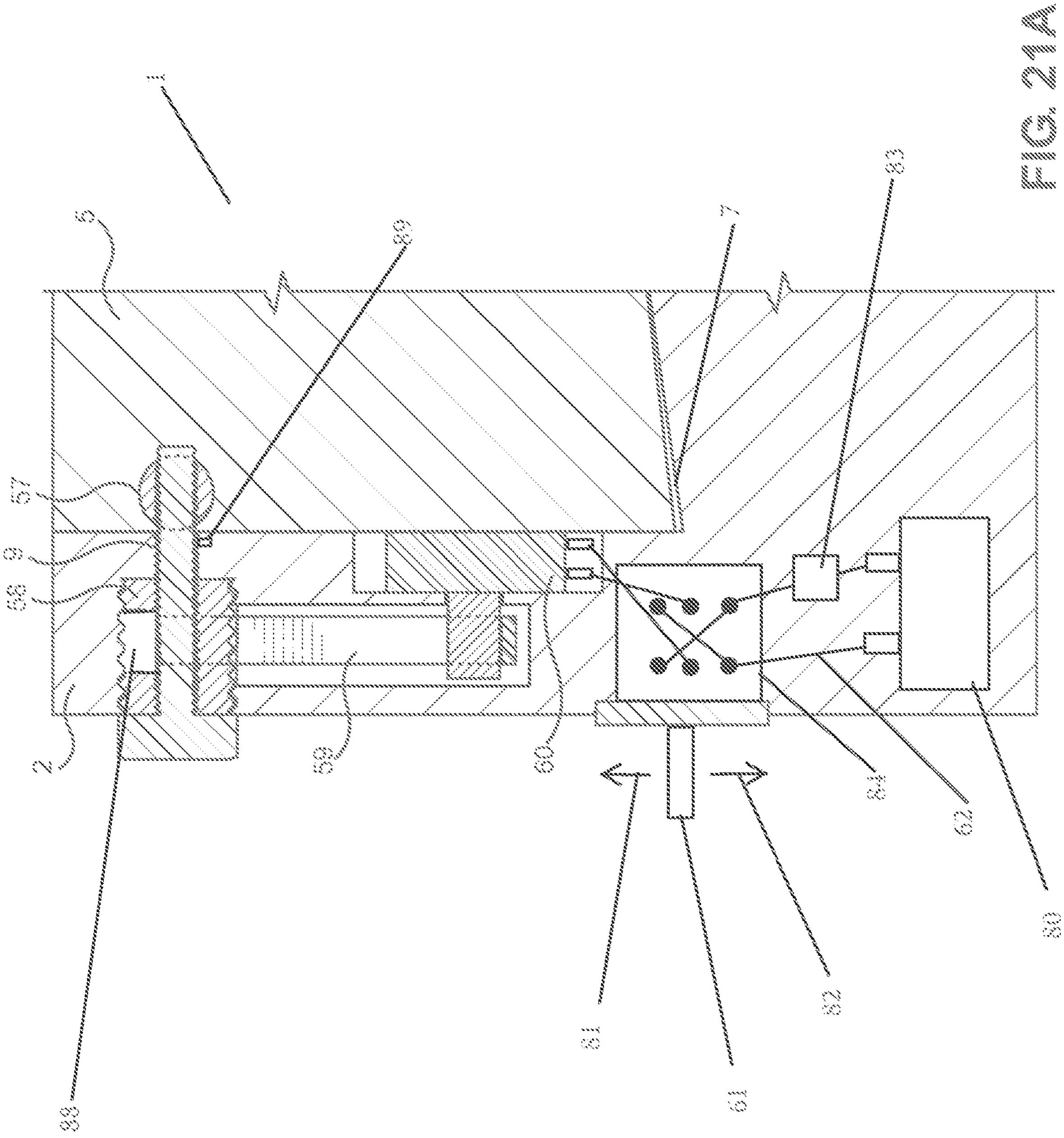
FIG. 21A is a sectional view having a circuit diagram of a second alternate embodiment of the body of the guitar having an electromechanical fastener mechanism.
Figure 21B:
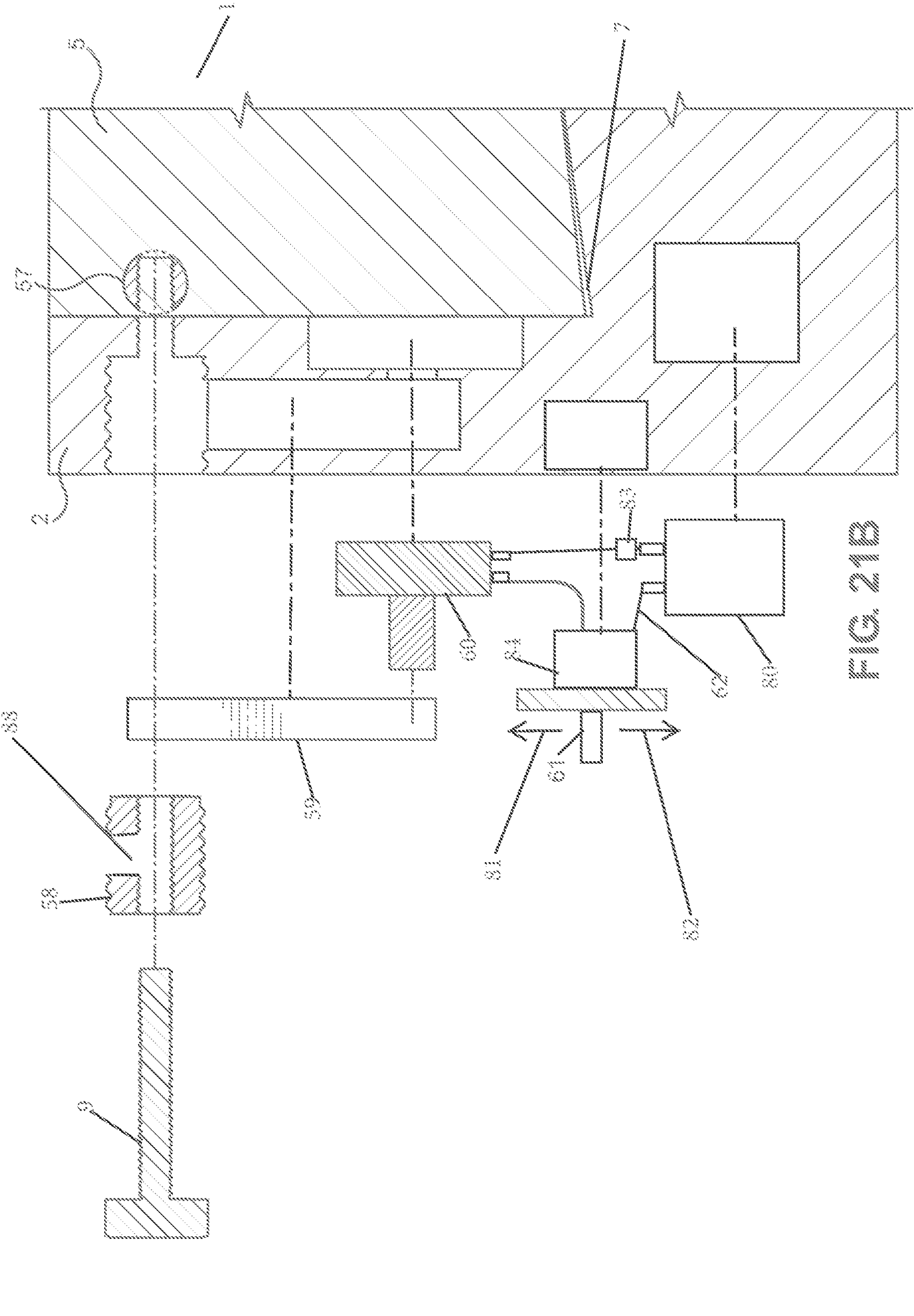
FIG. 21B is an exploded sectional view of a second alternate embodiment of the body of the guitar having an electromechanical fastener mechanism.
Figure 23:
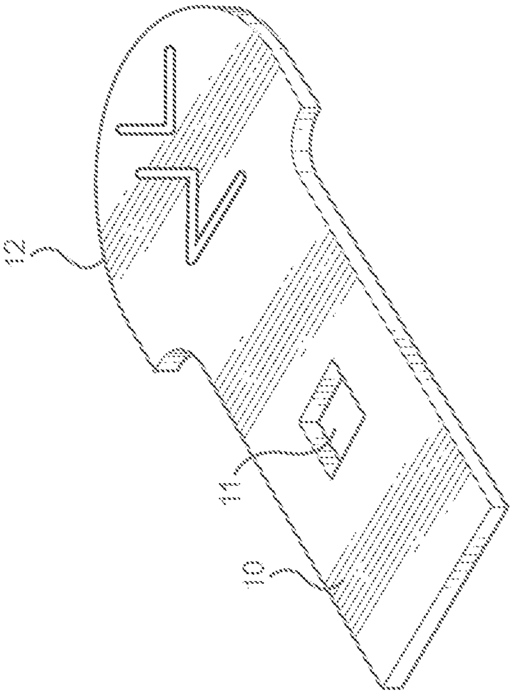
FIG. 23 is a perspective view of a third alternate embodiment having a locking plate.
Figure 22:
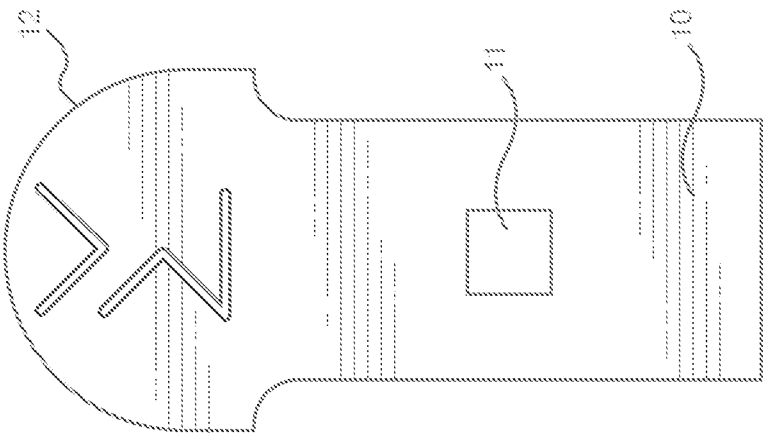
FIG. 22 is a top plan view of a third alternate embodiment having a locking plate.
Figure 24:
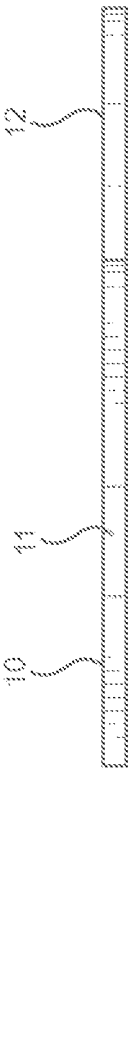
FIG. 24 is a left-side elevational view of a third alternate embodiment having a locking plate.
Figure 25:
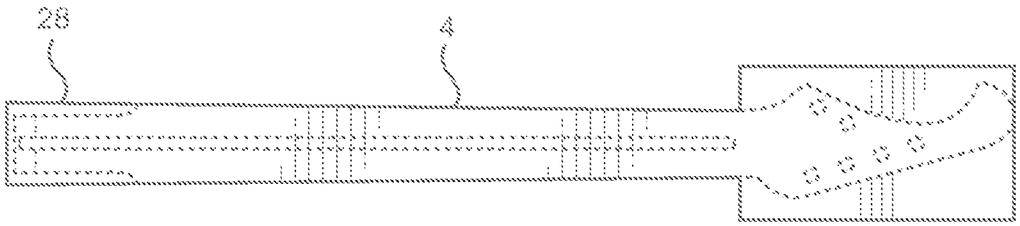
FIG. 25 is a top sectional view of a third alternate embodiment of the novel removable neck having a locking plate.

FIGS. 21A and 21B illustrate a second alternate embodiment of body 2 of guitar 1 having an electromechanical fastening mechanism. The electromechanical fastening mechanism has a power source 80 electrically connected to 83 circuit breaker and a switch 84. It is within the scope of this invention for an electrical connection 62 or electrical communication to include, but not be limited to, a wired connection with a wire. Circuit breaker 83 is connected to switch 84. Switch 84 is in electrical communication with motor 60. It is within the scope of this invention for motor 60 to include, but not be limited to, an AC or DC motor. When lever 61 of switch 84 is actuated in first direction 81 and/or second direction 82, power source 80 powers motor 60 and motor 60 rotates and drives belt 59. Belt 59 rotates nut 58. When nut 58 rotates, fastener 9 is either installed or removed from cam locking fastener 57.

FIGS. 21A and 21B also show an alternative embodiment in which belt 59 rotates fastener 9 directly when nut 58 has recess 88. Recess 88 of nut 58 positions belt 59 to directly connect with fastener 9 when fastener 9 is retained in nut 58. Fastener 9 could have limiting structure 89 (FIG. 21A) being a protrusion, located anywhere along the shaft of fastener 9 to prevent fastener 9 from being completely removed from nut 58 but also allowing fastener 9 to be received by cam locking fastener 57 of capturing structure 5, as fastener 9 needs to be completely removed from cam locking fastener 57 of capturing structure 5 for removal. If fastener 9 were completely removed from nut 58, then belt 59 would collapse. It is within the preferred embodiment of this invention for fastener 9 to not be fully removed from nut 58 having recess 88. Belt 59 is received by recess 88 of nut 58. Belt 59 will directly touch fastener 9 and rotate fastener 9 when switch 84 is actuated. Capturing structure 5 of removable neck 4 has cam locking fastener 57 which receives fastener 9 when fastener 9 is installed. Fastener 9 anchors capturing structure 5 of removable neck 4 within recess 7 of body 2 of guitar 1. Belt 59 is driven by motor 60. Motor 60 is actuated with switch 61 located on body 2 of guitar 1.

FIGS. 21A and 21B illustrate a second alternate embodiment of body 2 of guitar 1 having an electromechanical fastening mechanism. Lever 61 of switch 84 may be oriented in a first direction 81 to install fastener 9 into body 2 and capturing structure 5 of neck 4 of guitar 1. Switch 61 may be oriented in a second direction 82 to remove fastener 9 from body 2 and capturing structure 5 of neck 4 of guitar 1. Power source 80 is in electrical communication 62 with motor 60 and with power source 80. It is within the scope of this invention for power source 80 to include, but not be limited to, a battery. Power source 80 and switch 61 are in electrical communication and/or are electrically connected with a cord to circuit breaker 83.

Figure 26:
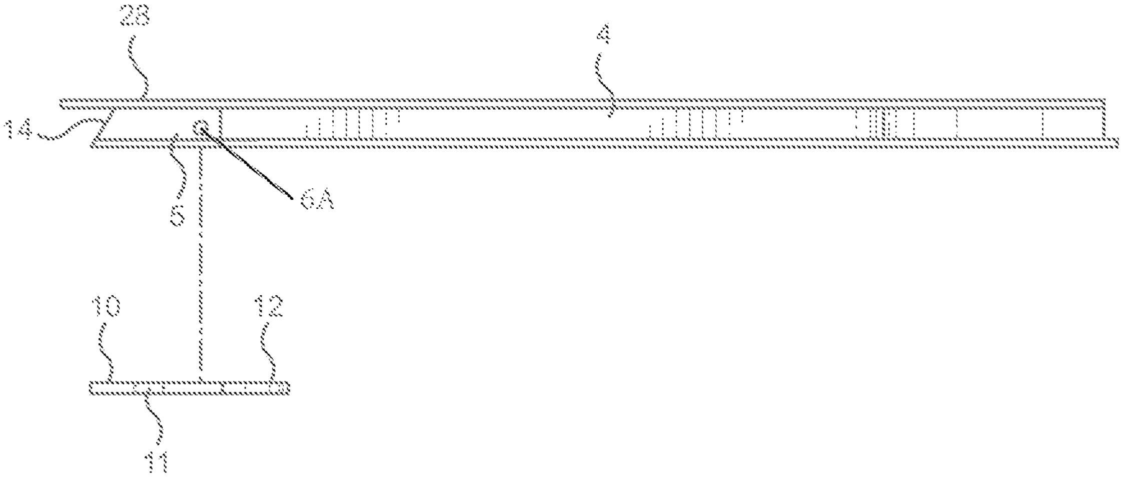
FIG. 26 is a left-side exploded view of a third alternate embodiment of the novel removable neck having a capturing structure having a first opening, a guide ramp, and a locking plate.
Figure 27:
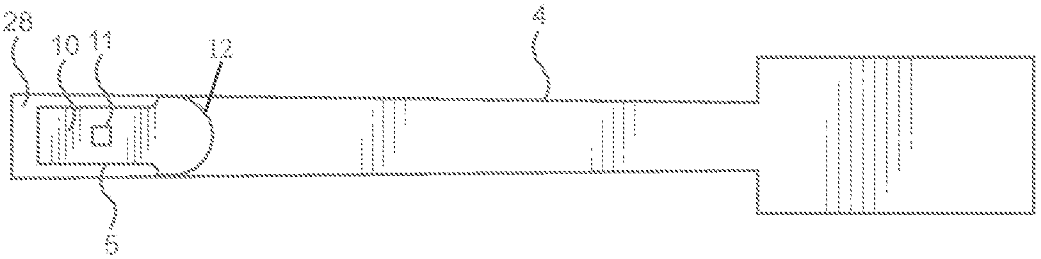
FIG. 27 is a bottom plan view of a third alternate embodiment of the novel removable neck and capturing structure having locking plate with an opening.
Figure 28:
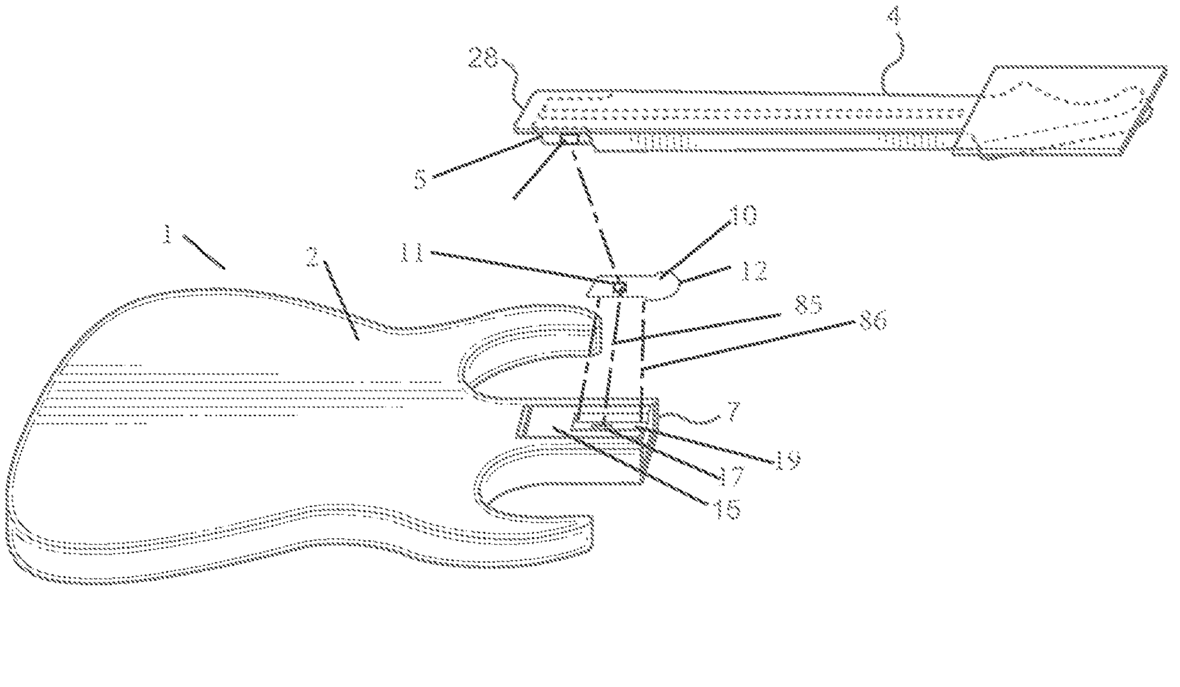
FIG. 28 is an exploded sectional view of a third alternate embodiment of the novel removable neck and capturing structure having a locking plate received by a locking mechanism of the body of the guitar.
Figure 29:
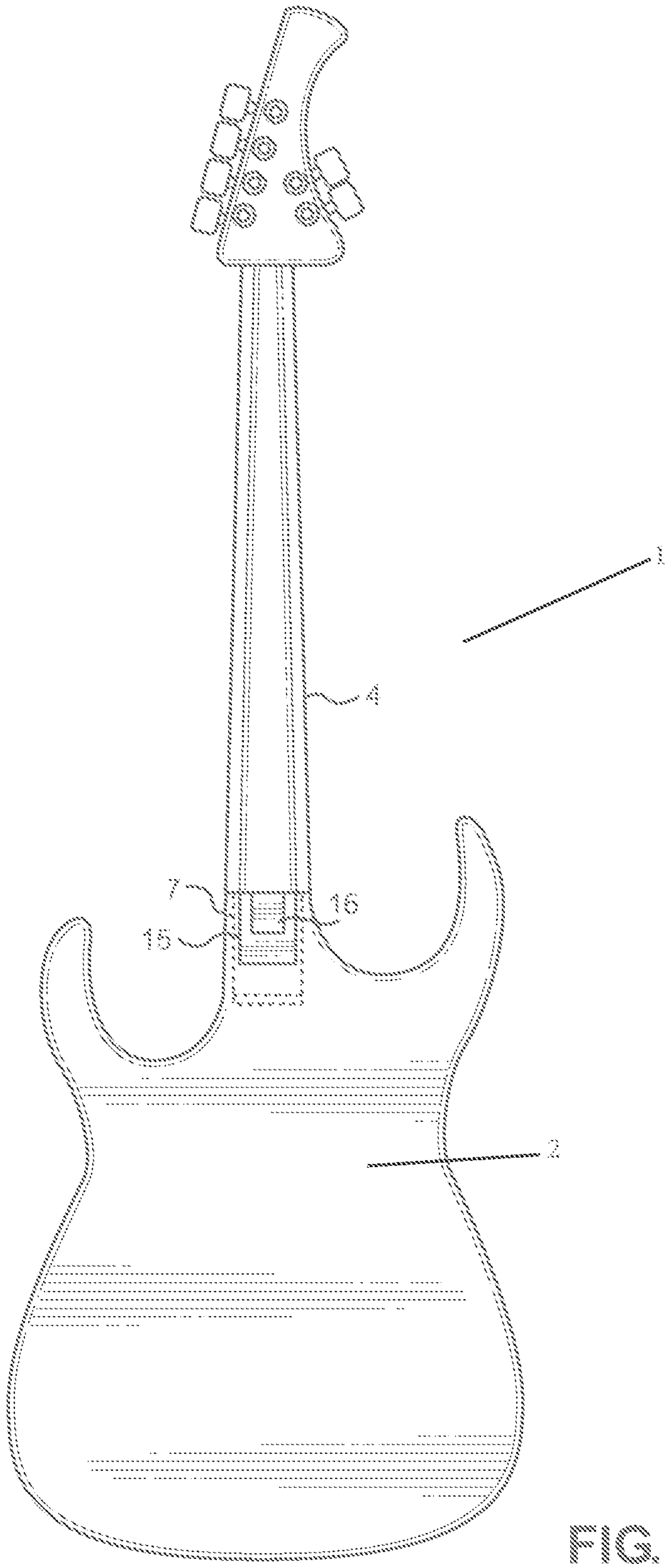
FIG. 29 is a bottom sectional view of a third alternate embodiment of the novel removable neck and the body of the guitar having a locking mechanism.
Figure 30:
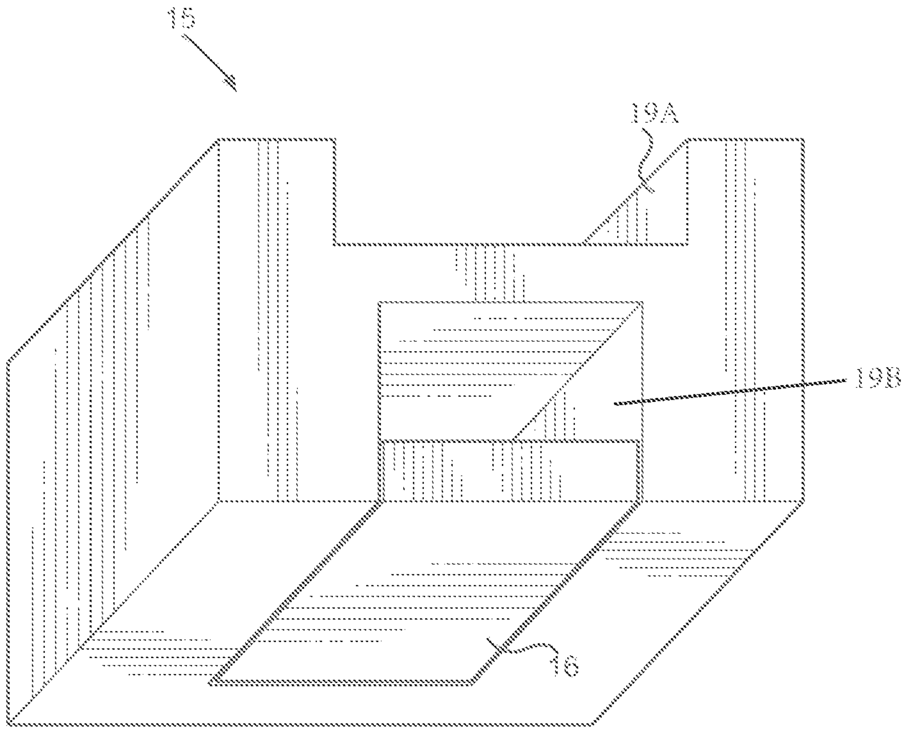
FIG. 30 is a perspective view of a third alternate embodiment of the locking mechanism having a lever.

FIGS. 22-36 illustrate a third embodiment of guitar having interchangeable neck and bridge components of alternate embodiment 1, where the body of the guitar has a locking mechanism. FIGS. 22-24 and 26-28 show locking plate 10 having opening 11 and radiused portion 12. FIGS. 25-29 show removable neck 4 having fretboard 28 of embodiments 1 and 2, however, in this embodiment, locking plate 10 is connected to capturing structure 5 (FIGS. 26-28). FIGS. 28-29 depicts guitar 1 having body 2. Body 2 of guitar 1 has recess 7 retaining locking mechanism 15. Locking mechanism 15 has lever 16 (FIGS. 29 and 30) positioned within second chamber 19B (FIGS. 30 and 36) located opposite first chamber 19A (FIGS. 28 and 30).

Figure 33:
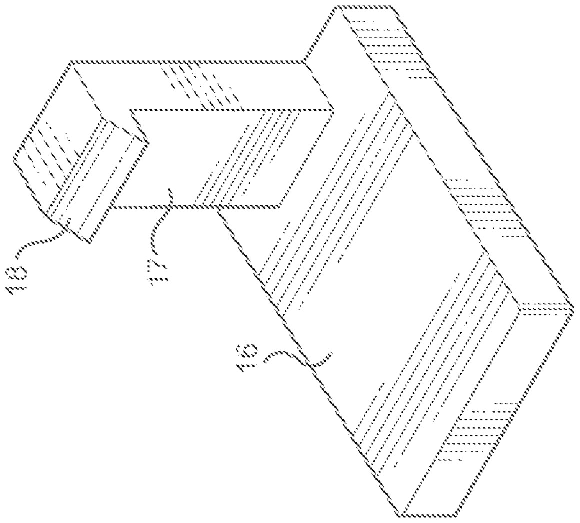
FIG. 33 is a perspective view of a third alternate embodiment of the latching structure of the locking mechanism having a lever.
Figure 32:
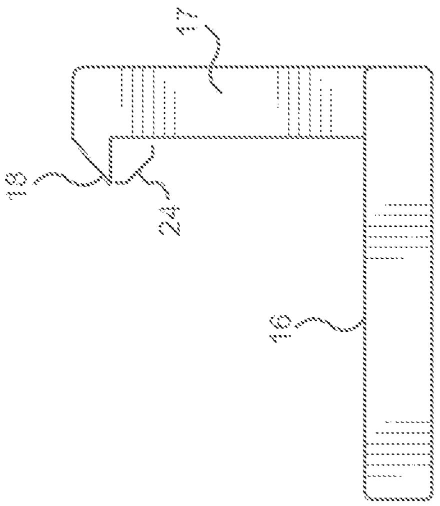
FIG. 32 is a right-side elevational view of a third alternate embodiment of the latching structure of the locking mechanism having a lever.
Figure 31:
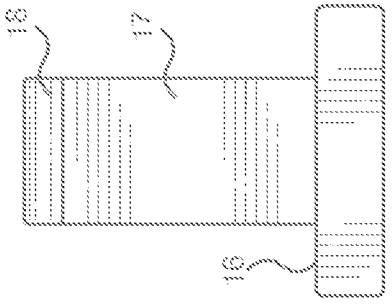
FIG. 31 is a top plan view of a third alternate embodiment of the latching structure of the locking mechanism having a lever.

FIG. 28 shows capturing structure 5 of removable neck 4 has locking plate 10 configured to connect thereto. Opening 11 of locking plate 10 is configured to align with and/or overlay 85 latching structure 17 of locking mechanism 15. Capturing structure 5 and locking plate 10 are configured to be retained 86 within first chamber 19A of locking mechanism 15. It is within the scope of this invention for capturing structure 5 to have opening 6B or recess that opening 11 of locking plate 10 aligns with. FIGS. 31-33 show lever 16 has substantially L-shaped latching structure 17. Latching structure 17 has tooth 18 located perpendicular 24 to latching structure 17. Opening 6B of capturing structure 5 and/or locking plate 10 is engaged by tooth 18 of latching structure 17 when capturing structure 5 is received by first chamber 19A of locking mechanism 15 of guitar 1. First chamber 19A of locking mechanism 15 of guitar 1 retains said capturing structure 5 of said removable neck 4 when locking mechanism 15 is engaged.

Figure 34:
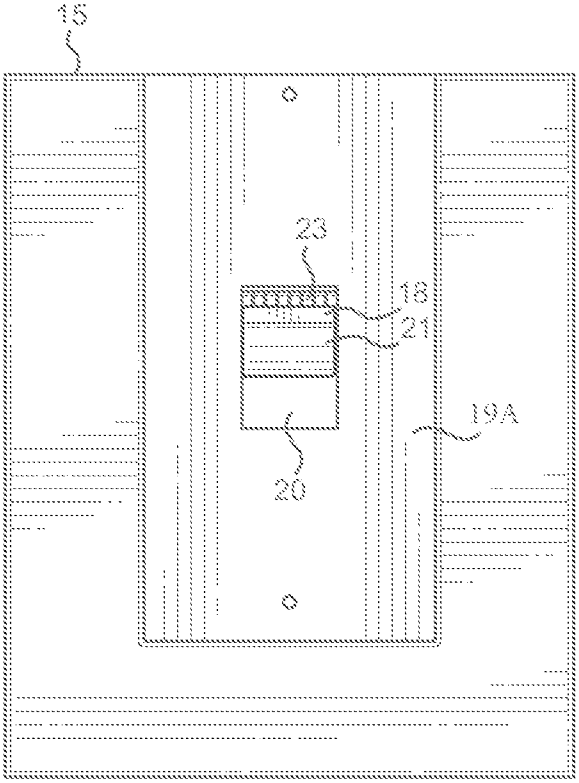
FIG. 34 is a top plan view of a third alternate embodiment of the locking mechanism having a locked engaged with magnets in a closed orientation.
Figure 35:
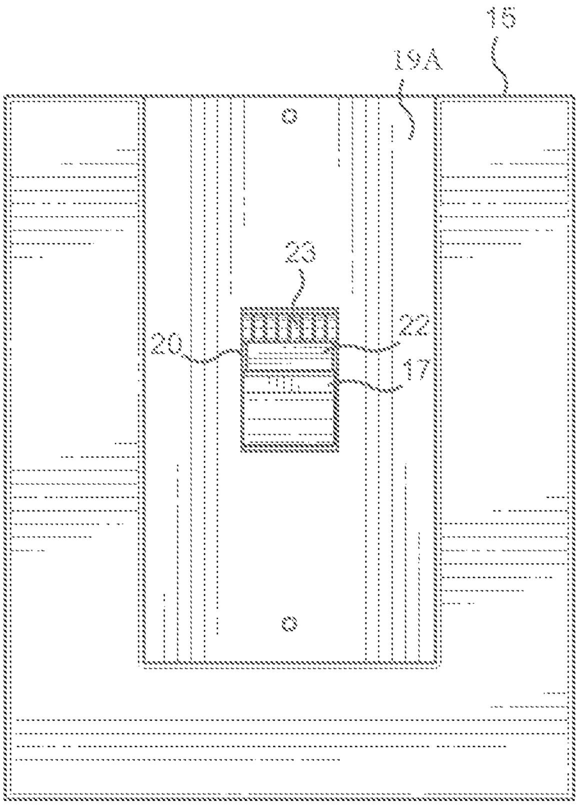
FIG. 35 is a top plan view of a third alternate embodiment of the locking mechanism having a locked disengaged with magnets in an open orientation.
Figure 36:
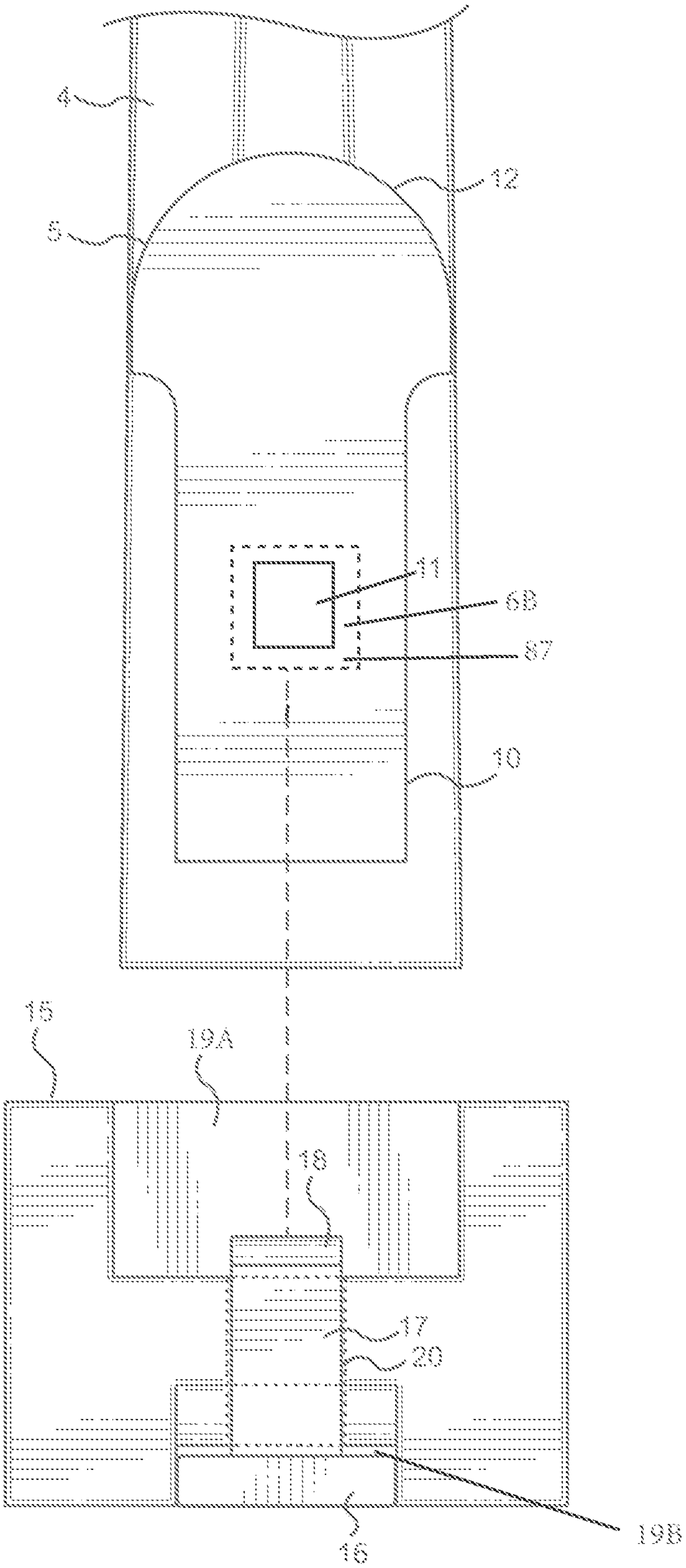
FIG. 36 is an exploded sectional view of a third alternate embodiment of the removable neck having a capturing structure and a locking plate configured to be received by locking mechanism having a latching structure.

FIGS. 34-36 illustrate locking mechanism 15 of the third embodiment. Locking mechanism 15 has first chamber 19A. Central bore 20 of first chamber 19A retains latching structure 17 of lever 16 (FIGS. 29-33, and 36). FIG. 34 shows latching structure 17 in a closed or locked 21 configuration when tooth 18 is connected to magnets 23. FIG. 36 shows that during installation of removable neck 4, tooth 18 of latching structure 17 is configured to connect with opening 11 of locking plate 10 when locking plate 10 is connected to capturing structure 5 of removable neck 4. In particular, opening 11 of locking plate 10 is smaller in size than opening 6B of capturing structure 5. When opening 11 of locking plate 10 is aligned with opening 6B of capturing structure 5, flange 87 forms. Flange 87 (FIG. 36) is outer perimeter edge bordering opening 11 of locking plate 10. It is this flange 87 of locking plate that tooth 18 of latching structure 17 engages and/or is connected to when capturing structure 5 is installed and/or retained within chamber 19 of locking mechanism 15. FIG. 35 shows latching structure 17 in an open or unlocked 22 configuration when tooth 18 is released from magnets 23 when lever 16 is actuated to release removable neck 4 from body 2 of guitar 1. Tooth 18 (FIG. 36) of latching structure 17 protrudes from central bore 20 at first chamber 19A of locking mechanism 15.

FIGS. 37-40 illustrate an alternate embodiment of bridge 97 that changes out the screws per each string. With a single bridge "saddle" and/or removable plate 103 that spans across all the strings 26A-26F, it will match the radius of the fretboard for accommodations. Removable plate 103 retains strings 26A-26F though so when bridge 97 is removed from the guitar, the strings 26A-26F will remain retained and secured within the openings of the bridge. Underneath each side of removable plate 103 will be an opening 110A and 110B retaining a fastener 111 such as a screw, in the base which will raise and lower each side.

Figure 37:
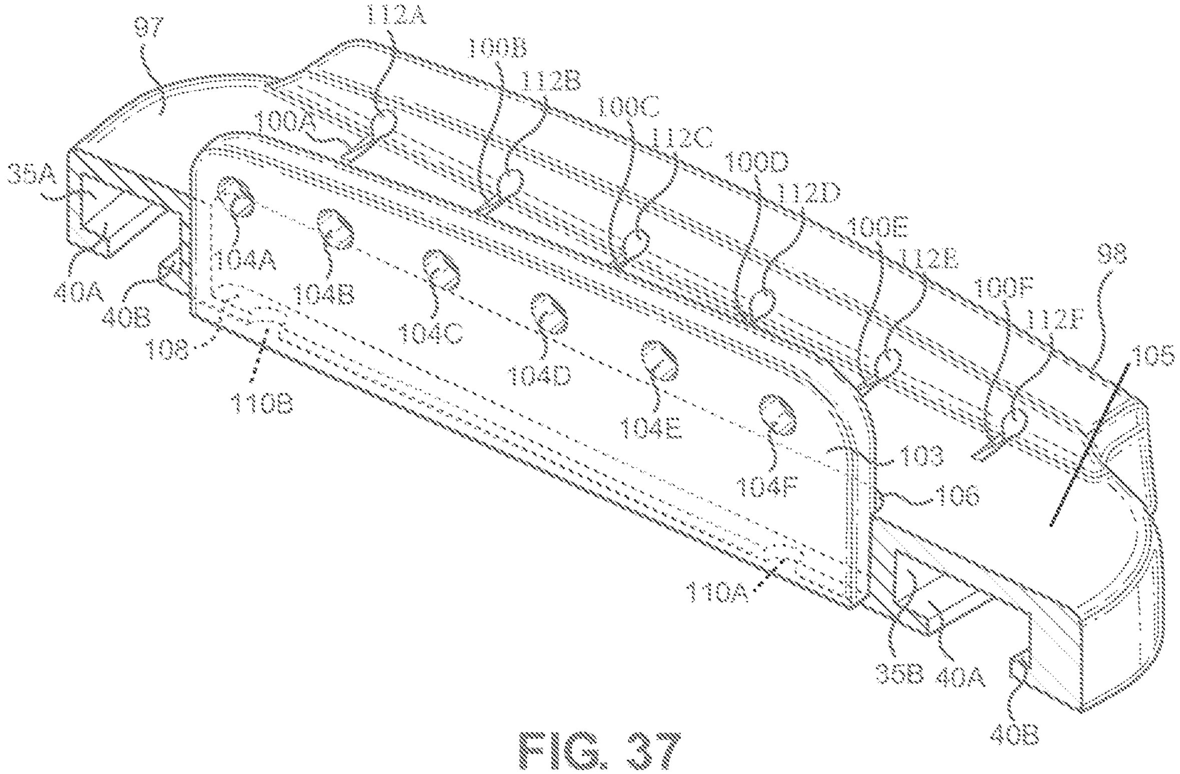
FIG. 37 is a sectional view of a fourth embodiment of the bridge having a chamber retaining a plate with a plurality of openings receiving a string.
Figure 38:
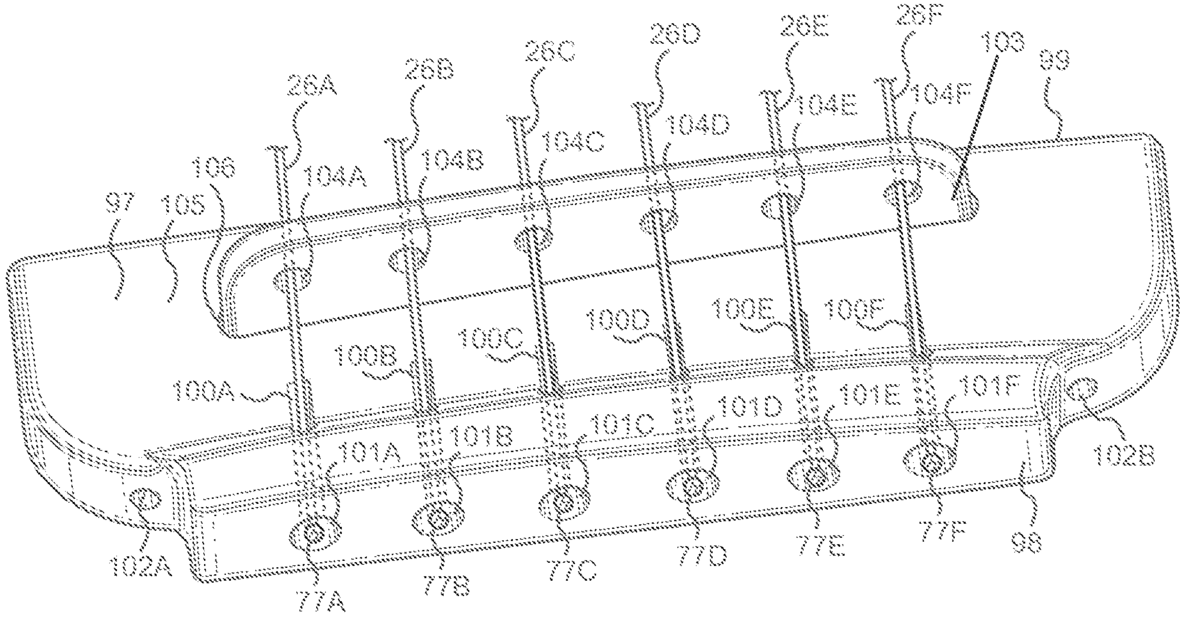
FIG. 38 is a sectional view of the fourth embodiment of the bridge having a plurality of openings on the first side of the bridge with each opening receiving a string oriented through guide ramps and through a plurality of openings of a plate retained within a chamber of the bridge.
Figure 39:
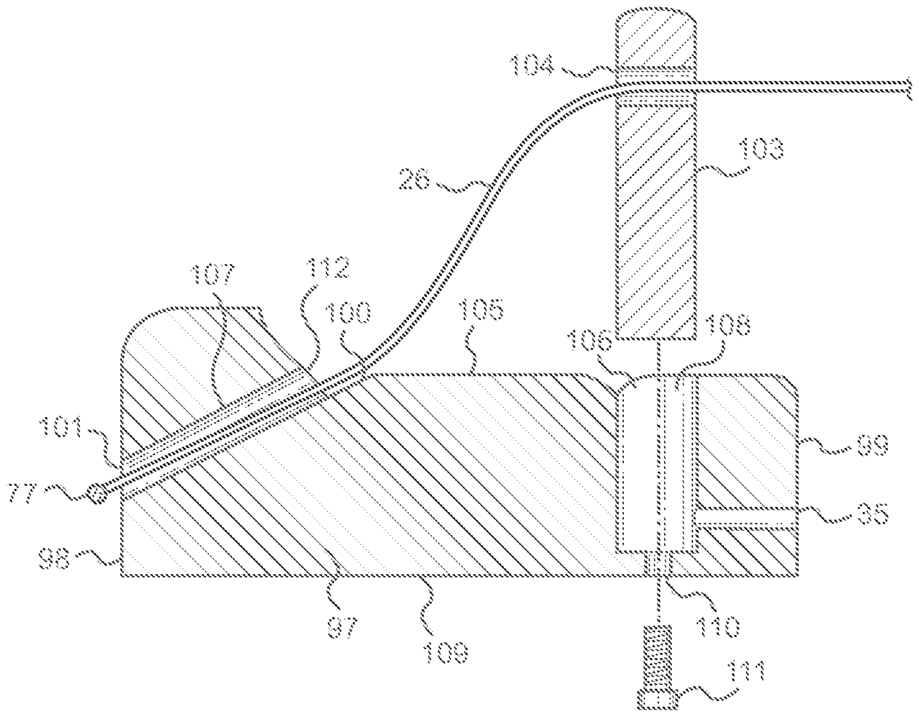
FIG. 39 is a side sectional view of the fourth embodiment of the bridge having a plurality of openings on the first side of the bridge with each opening receiving a string oriented through guide ramps and through a plurality of openings of a plate retained within a chamber of the bridge.
Figure 40:
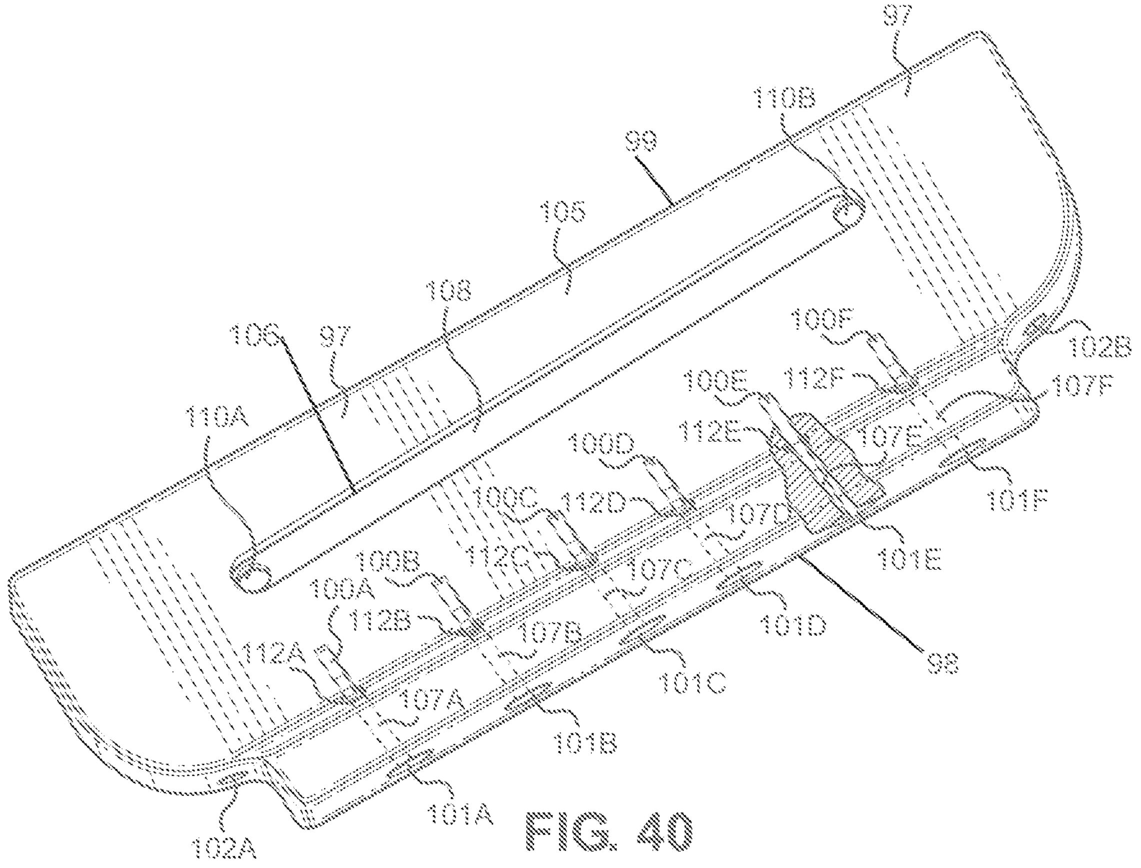
FIG. 40 is a top sectional view of the fourth embodiment of the bridge having a plurality of openings on the first side of the bridge connected to a plurality of bores connected to a plurality of guide ramps.
Figure 41:
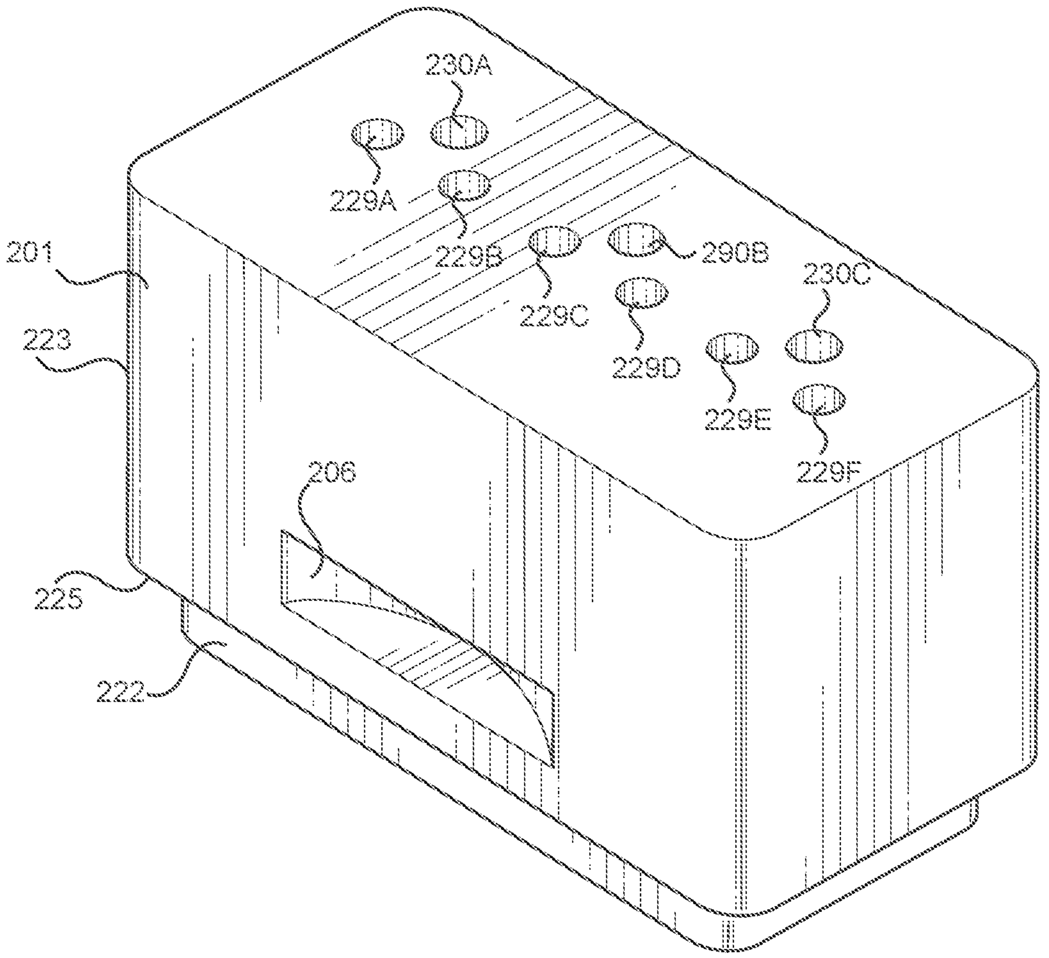
FIG. 41 is a perspective view of the bridge block having a recess and a plurality of openings.
Figure 42:
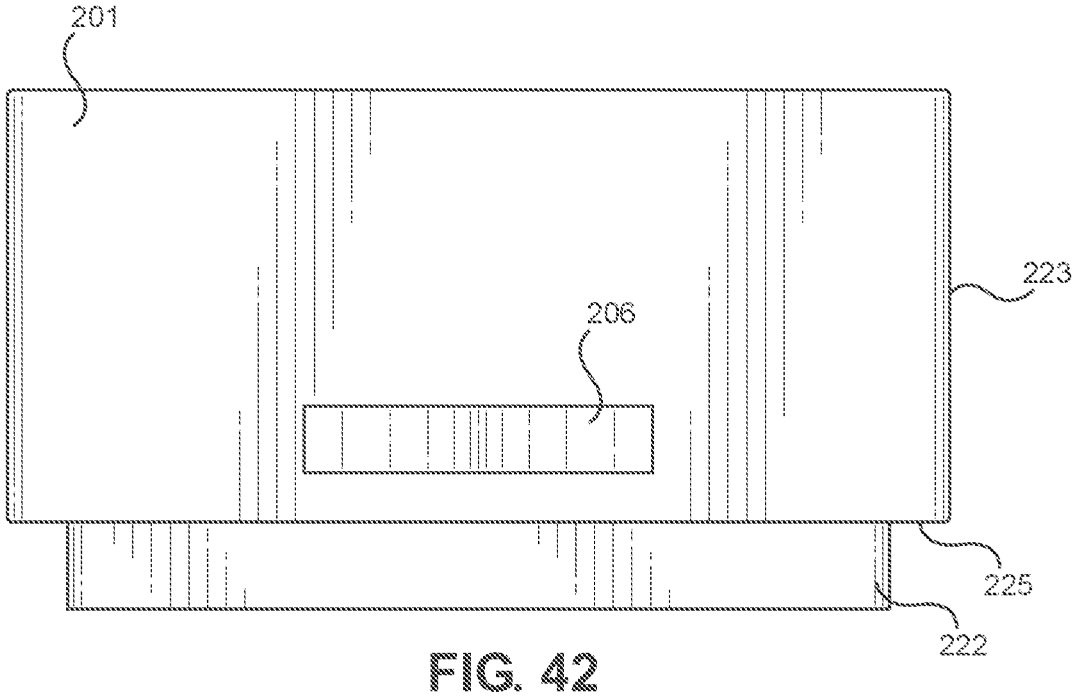
FIG. 42 is a side plan view of the bridge block having a recess and a plurality of openings.
Figure 43:
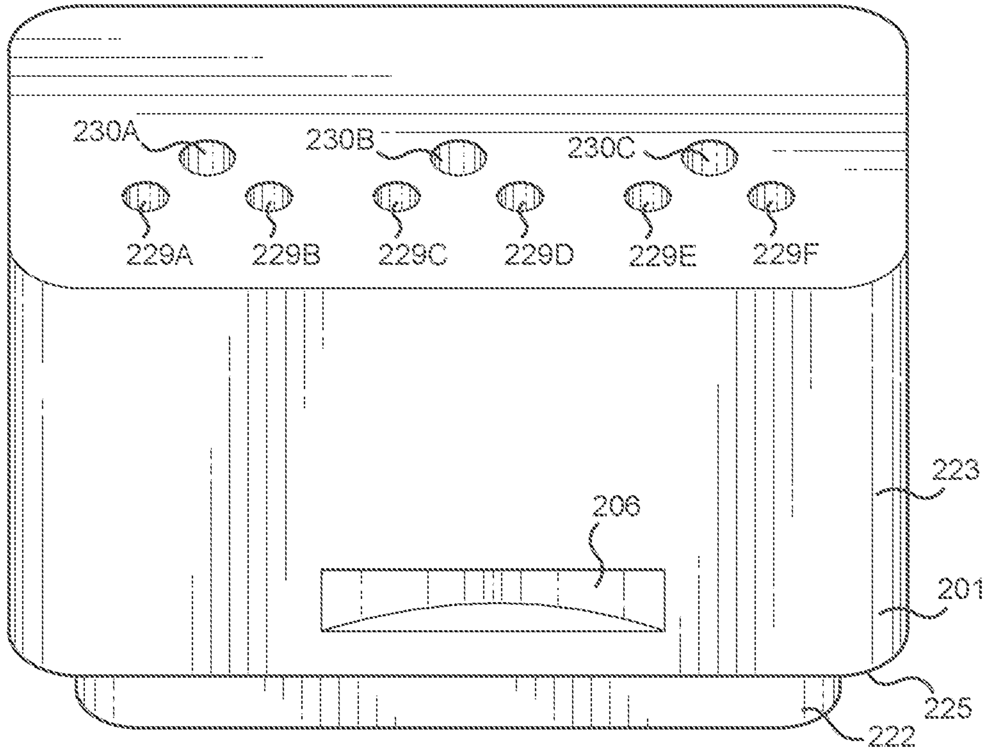
FIG. 43 is a top perspective view of the bridge block having a recess and a plurality of openings.
Figure 44:
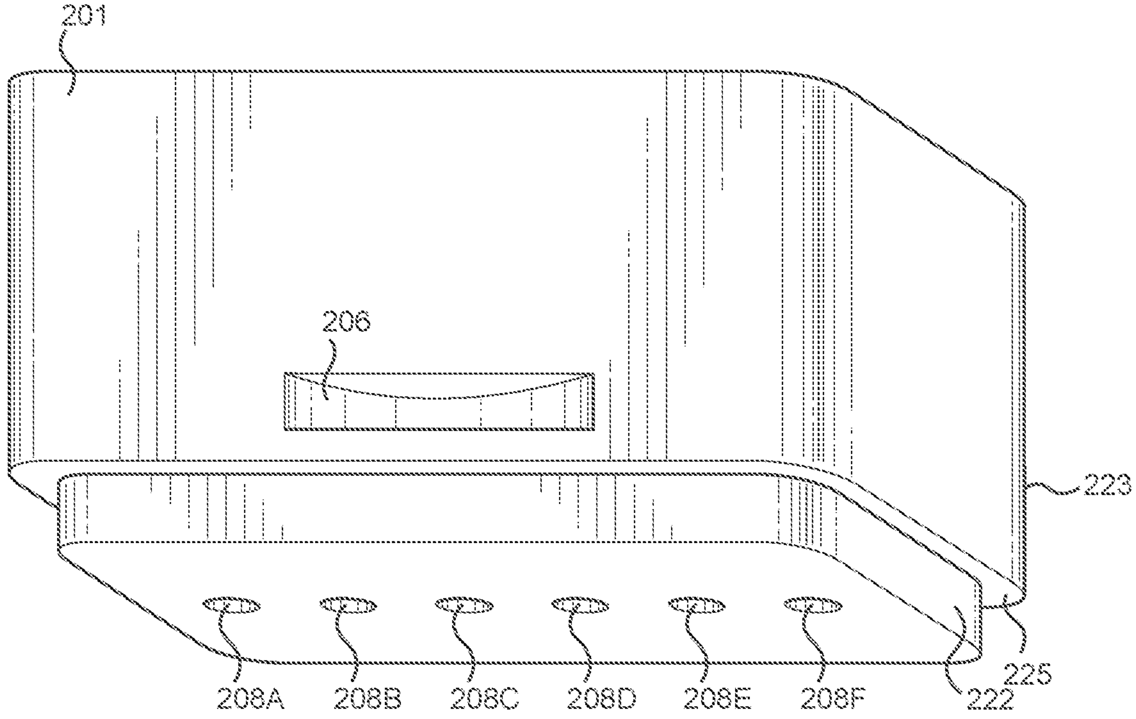
FIG. 44 is a rear perspective view of the bridge block having a recess and a plurality of openings.
Figure 45:
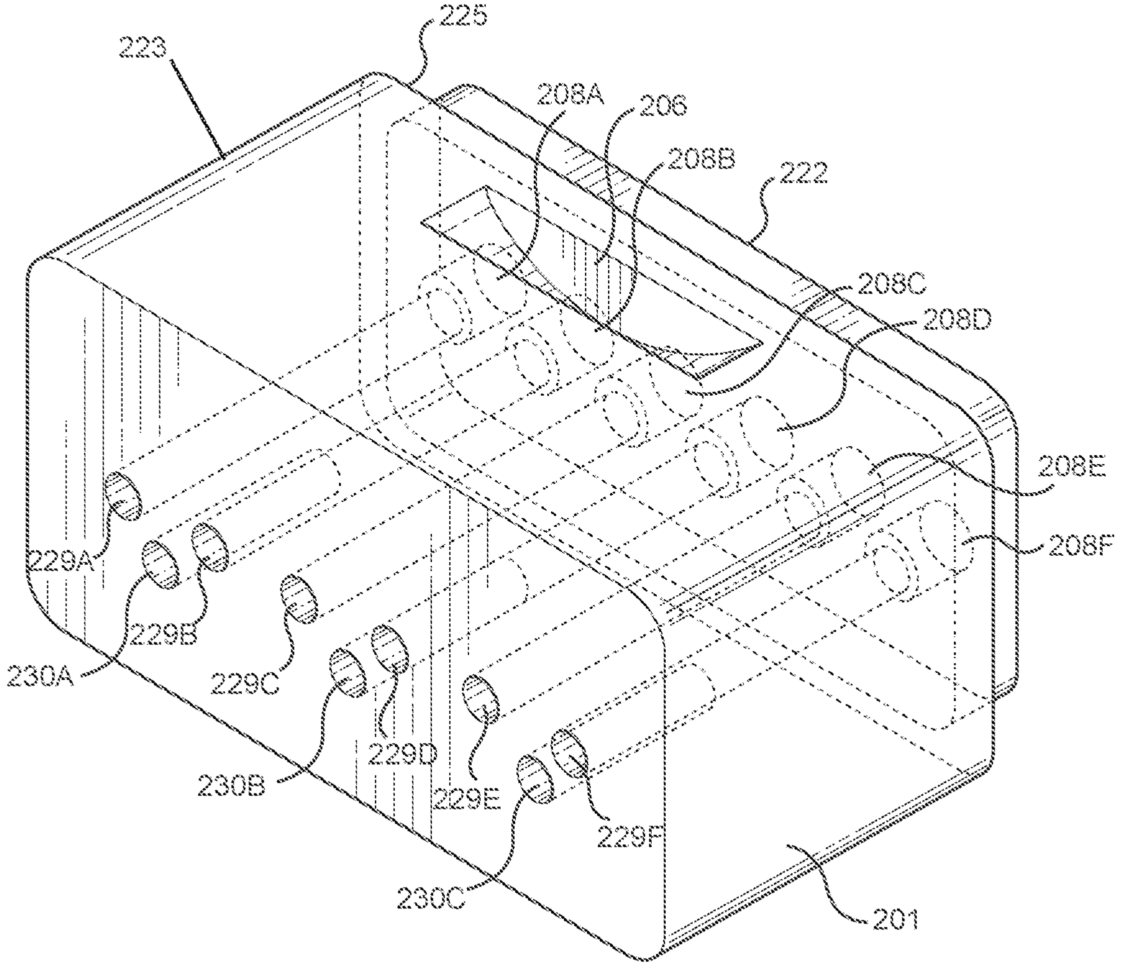
FIG. 45 is a cut-away view of the bridge block having a recess and a plurality of openings.

FIGS. 37-40 depict a fourth embodiment of bridge 97 having first side 98 located opposite second side 99 (FIGS. 38-40). First side 98 of bridge 97 has plurality of openings 101A-101F (FIGS. 38-40) connected to plurality of bores 107A-107F (FIGS. 39 and 40) connected to plurality of openings 112A-112F (FIGS. 37 and 39-40) connected to plurality of guide ramps 100A-100F. Bridge 97 has top surface 105 located opposite bottom surface 109 (FIG. 39). Top surface 105 of bridge 97 has opening 106 bordering chamber 108 (FIGS. 37, 39-40). Plate 103 (FIGS. 37-39) has plurality of openings 104A-104F (FIGS. 37-39) receiving plurality of strings 26A-26F (FIGS. 38 and 39). Plate 103 is retained within chamber 108 of bridge 97. Plurality of strings 26A-26F each have a ball end 77A-77F (FIGS. 38 and 39). Ball end 77 of string 26 is retained within opening 101 of first side 98 of bridge 97. First side 98 of bridge 97 has plurality of openings 101A-101F (FIGS. 38-40) receiving plurality of strings 26A-26F that traverse through plurality of bores 107A-107F (FIGS. 39 and 40) through plurality of openings 112A-112F (FIGS. 37 and 39-40) and are then guided through plurality of guide ramps 100A-100F.

FIG. 37 best shows bridge 97 having first flange 40A FIG. 11 and second flange 40B of first recess 35A and second recess 35B being removably connected to 74 (FIG. 7C) fasteners 69A and 69B (FIG. 7C) of body 2 of guitar 1. It is also within the scope of this invention for bridge 97 having first flange 40A and second flange 40B of first recess 35A and second recess 35B removably connected to 75 (FIG. 8) fasteners and/or bushings 52A and 52B (FIG. 8) of tremolo block 51 of guitar 1. FIG. 39 illustrates bottom surface 109 of bridge 97 having opening 110A (FIGS. 37, 39-40) and opening 110B (FIGS. 37, 39-40) aligned with chamber 108. Openings 110A and 110B receive fasteners 111 (FIG. 39) which are capable of adjusting the height of plate 103 when plate 103 is retained within chamber 108. FIGS. 38 and 40 show bridge 97 having openings 102A and 102B.

Figure 52:
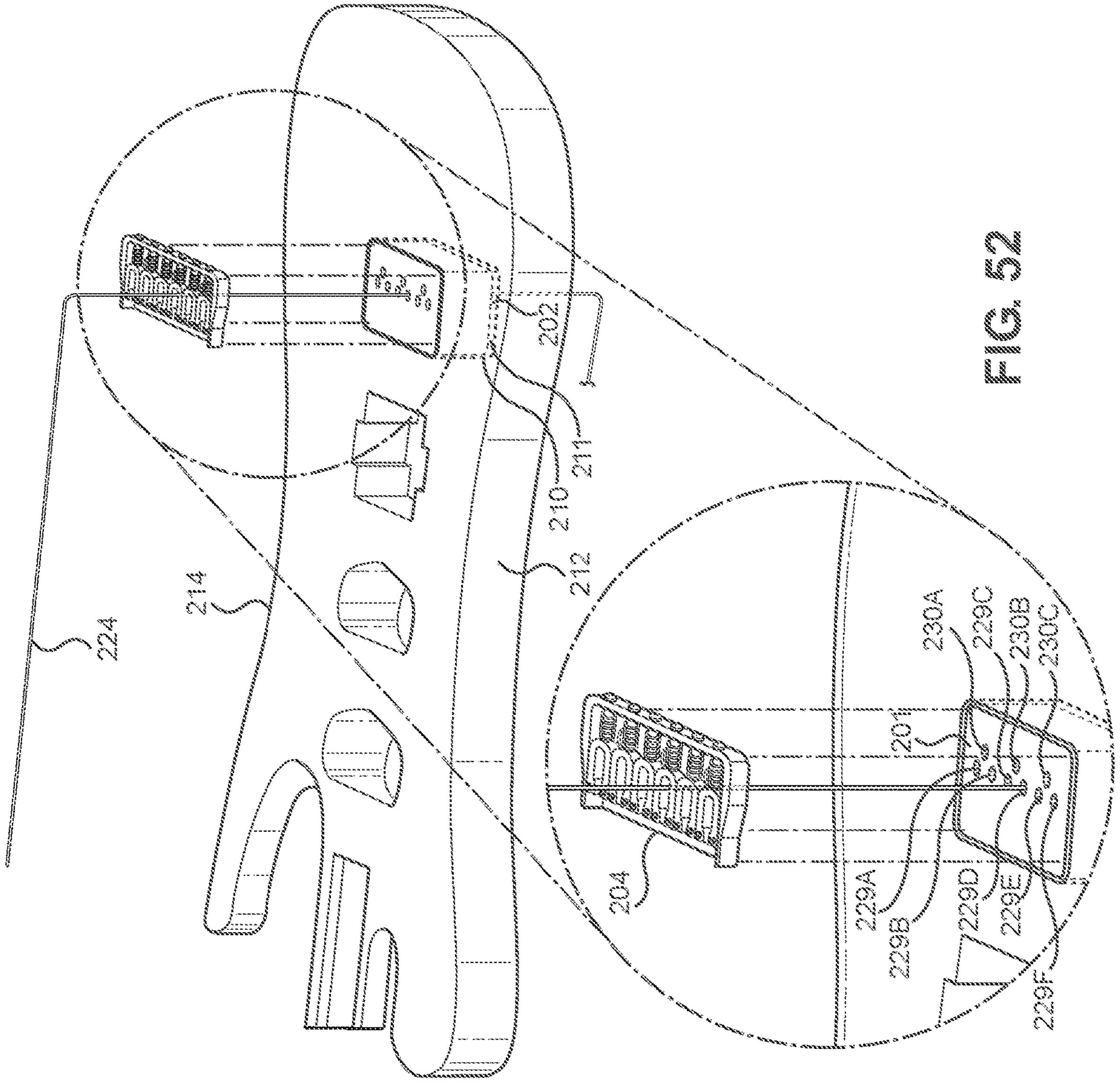
FIG. 52 is a top exploded view of a guitar strings traversing through openings of a bridge, the bridge is positioned over the bridge block, the bridge block is retained within the support structure of the body of a guitar.

FIGS. 41, 43, 45, 48-49, and 52 illustrate an alternate embodiment of bridge block 201 having plurality of openings 229A-229F on the top surface of bridge block 201. The plurality of openings 229A-229F traverse through the entire height of bridge block 201 and are configured to each receive a guitar string. Plurality of openings 230A-230C are located on the top of bridge block 201 and are configured to receive a fastener, such as a screw, to secure the removable bridge to the bridge block 201. FIGS. 44, 45, 53-56 show the opposite end of plurality of openings 229A-229F being plurality of openings 208A-208F each configured to receive string 224 (FIG. 52). Plurality of openings 208A-208F are located on stepped portion 222 (FIGS. 44-45 and 54) of bridge block 201.

FIGS. 41-45, 48-49, and 54-55 illustrate bridge block 201 with a side wall having recess 206. Recess 206 of bridge block 201 is configured to receive at least a portion of substantially curved portion of a plate of the locking mechanism. FIGS. 41-45, 48-49, and 54 show bridge block 201 having a first perimeter 223 and a second perimeter. FIGS. 41-45, 48, and 54 show first perimeter 223 is greater in size than second perimeter of stepped portion 222 of bridge block 201. Step 225 divides the first perimeter 223 from the second perimeter of stepped portion 222.

Figure 47:
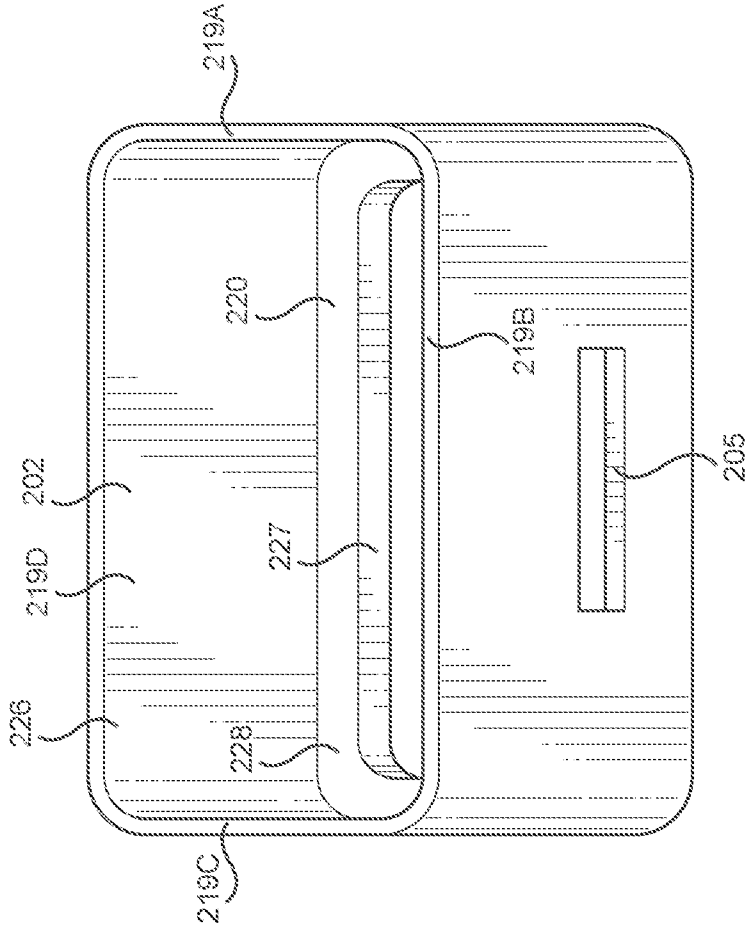
FIG. 47 is a top perspective view of the support structure having a flange extending from an inner wall surface of a first side wall, a second side wall, a third side wall, and a fourth side wall.
Figure 46:
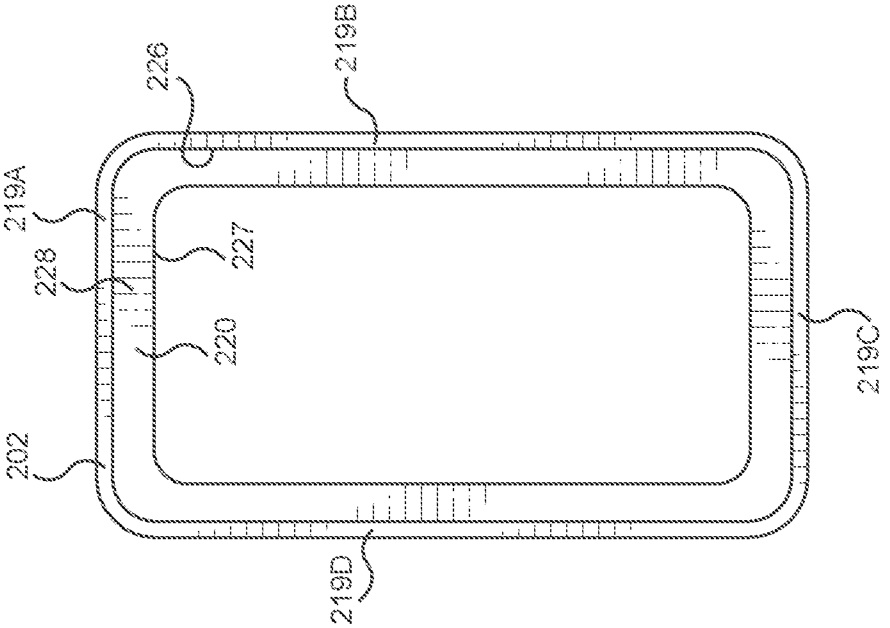
FIG. 46 is a top plan view of the support structure having a flange extending from an inner wall surface of a first side wall, a second side wall, a third side wall, and a fourth side wall.
Figure 48:
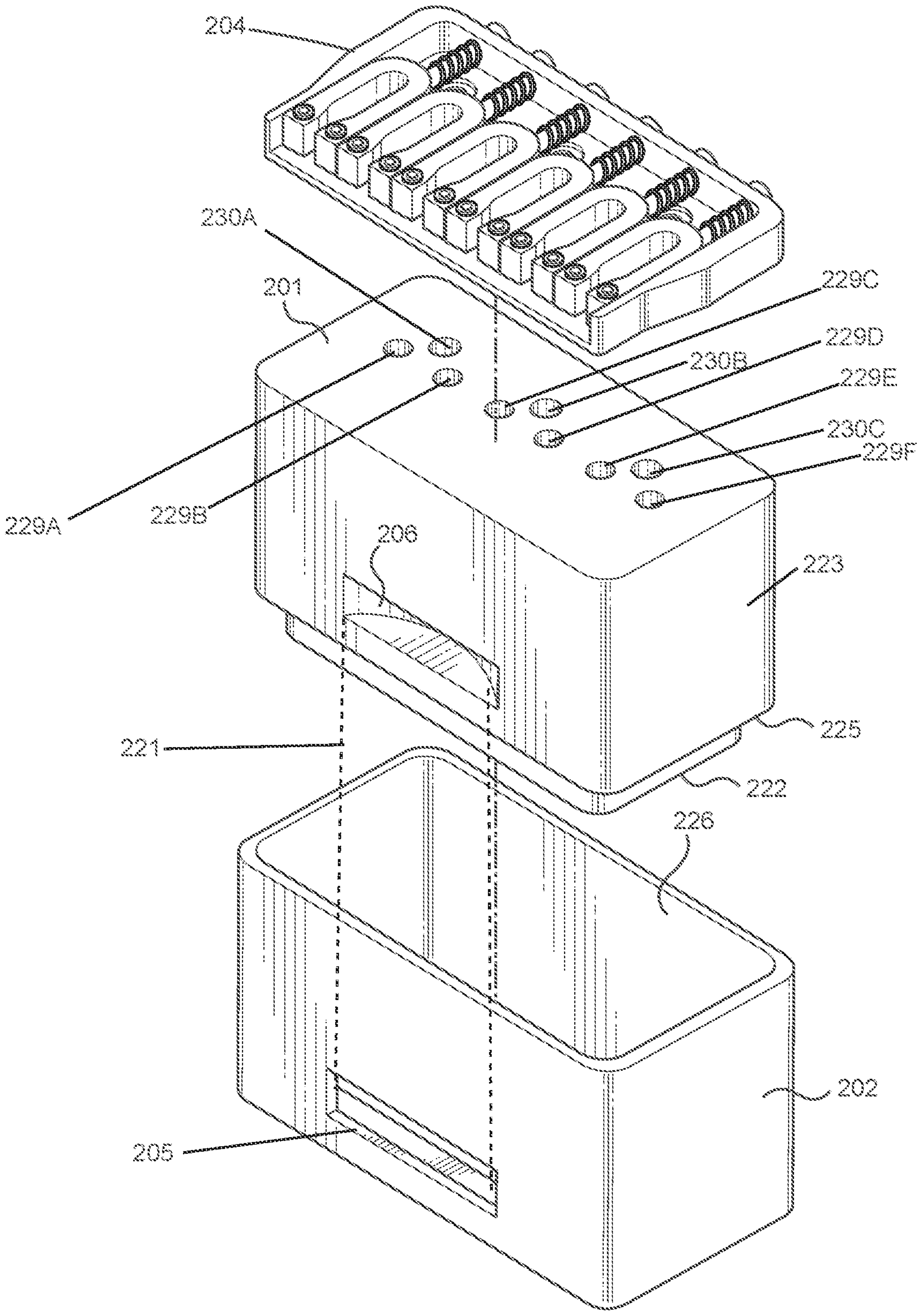
FIG. 48 is an exploded view of an opening located on a side wall of the support structure in alignment with a recess of the bridge block, the bridge is positioned over the bridge block and the bridge block is configured to be retained within the support structure.
Figure 49:
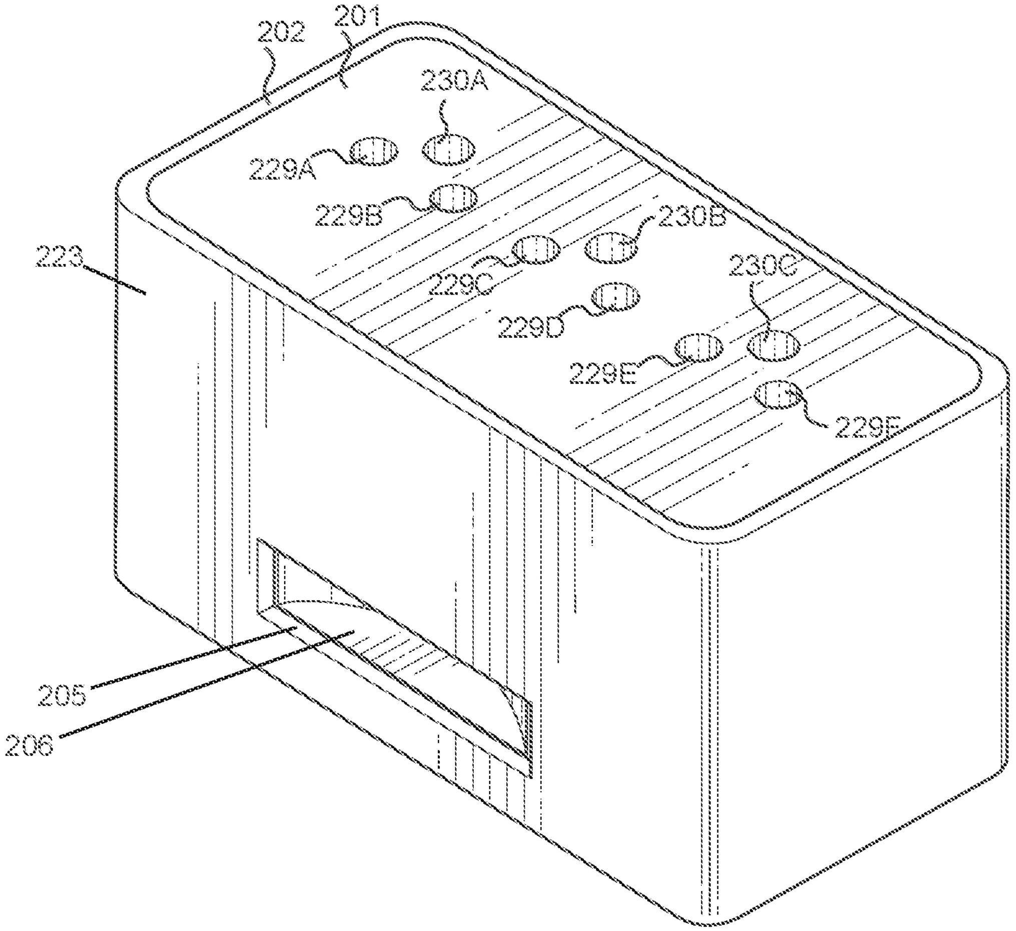
FIG. 49 is a top perspective view of the bridge block having a plurality of openings retained within the support structure.
Figure 50:
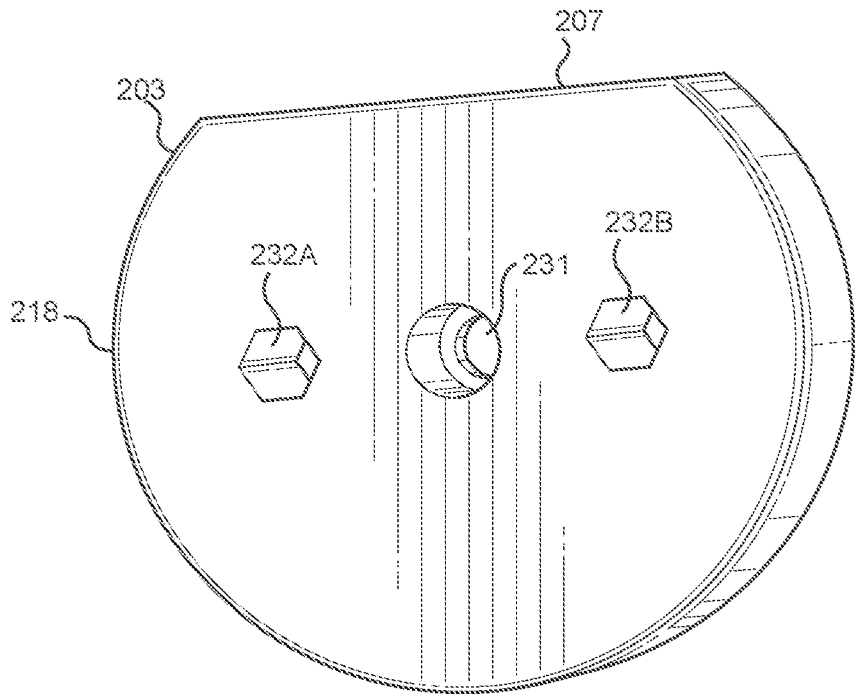
FIG. 50 is a front perspective view of the plate having a substantially curved edge and a flat edge.
Figure 51:
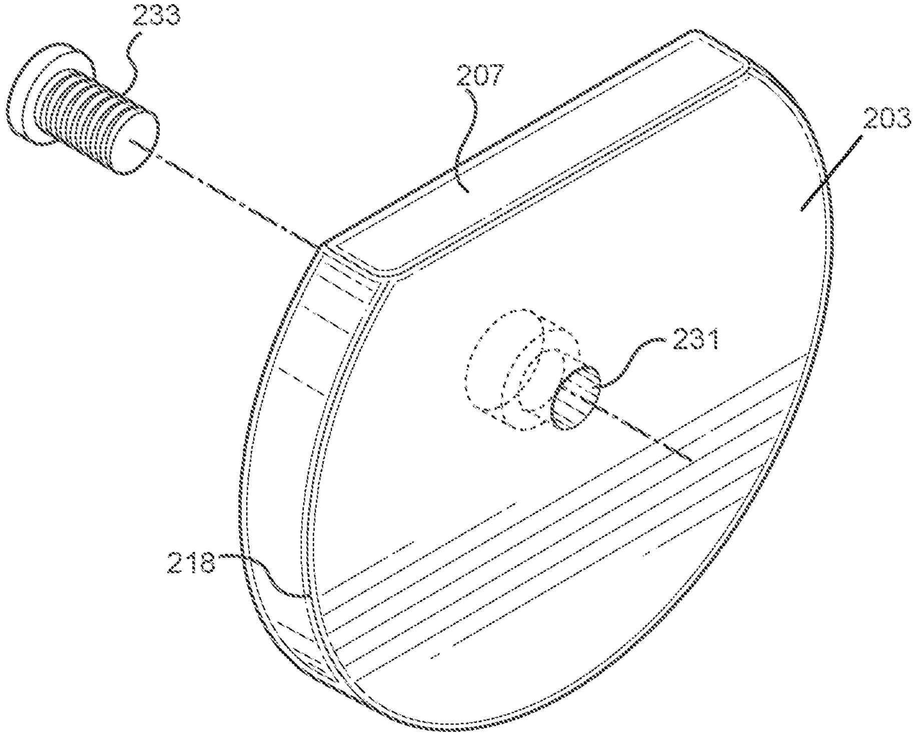
FIG. 51 is a rear perspective view of the plate having a substantially curved edge and a flat edge.

FIGS. 46-47 depict support structure 202 having first side wall 219A connected to second side wall 219B. Second side wall 219B is connected to third side wall 219C. Third sidewall 219C is connected to fourth sidewall 219D. Fourth sidewall 219D is connected to first sidewall 219A. Sidewalls 219A-219D of support structure 202 have inner wall surface 226. Support structure 202 is configured to be installed into an opening of a guitar to maintain the size and shape of the guitar opening so that the bridge block does not become stuck within the guitar opening if the wood of the guitar body swells. Flange 220 extends from the bottom edge of first side wall 219A, second side wall 219B, third side wall 219C, and fourth side wall 219D. Flange 220 of support structure 202 has inner wall surface 228 and edge 227. FIGS. 47-49 illustrates a sidewall of support structure 202 having opening 205 configured to receive at least a portion of a locking mechanism. A locking mechanism includes and latching member such as a plate, disk, and/or rotating element capable of being rotated to engage opening 205 of support structure 202 and recess 206 of bridge block 201.

FIGS. 48 and 52 show bridge 204 overlaying bridge block 201. Bridge block 201 is configured to be retained by support structure 202. Referring now to FIG. 48, recess 206 of bridge block 201 is in alignment 221 with opening 205 of support structure 202. First perimeter 223 portion of bridge block 201 is in contact with inner wall surface 226 of support structure 202 when bridge block 201 is installed in and retained by support structure 202.

FIGS. 50-51, and 53-56 depict plate 203 of the locking mechanism. Plate 203 has substantially curved edge 218. Plate 203 has flat edge 207. Openings 232A and 232B (FIGS. 50, 53-56) are configured to receive a hex key (not shown) for rotating 209 (FIGS. 55-56) plate 203 to an unlocked 234A (FIG. 55) or a locked 234B (FIG. 56) orientation. Central bore 231 (FIGS. 50 and 54) of plate 203 is configured to receive fastener 233 (FIGS. 51, and 53-56) including, but not limited to, a screw. Fastener 233 secures plate 203 to guitar 212.

It is within the scope of this invention for the locking mechanism to be any locking mechanism capable of having at least a portion of the locking mechanism engaging the bridge block to hold the bridge block it in place within the first compartment so that the bridge block does not become inadvertently removed from the guitar body. The locking mechanism can have at least a portion of the locking mechanism being a disk, a plate, a slidable latch, a protrusion and resilient member, such as a spring. In an alternate embodiment of the locking mechanism that is not illustrated, a slidable latch may have a latch portion that traverses at least a portion of the second compartment or within a recess of the second compartment. The one end of a latch has a handle portion and another end of the latch is received by the recess of the bridge block when the locking mechanism is in a locked orientation. A user may grasp the handle portion of the slidable latch and slide the latch so that the end portion does not connect with the recess of the bridge block when in an unlocked orientation. The latch may be manually operated by a user or may be electrically operated with a battery powered motor capable of sliding the latch into a locked and unlocked orientation.

In another embodiment that is not illustrated, when the bridge block is installed into the first compartment, a resilient member, such as a spring, will be depressed. When the recess of the bridge block receives a retractable protruding structure of the locking mechanism, the bridge block is locked into place and is securely retained within the first compartment. The retractable protruding structure may extend into the first compartment from a side wall of the first compartment and/or from the support structure. When the retractable protruding structure of the locking mechanism engages the recess of the bridge block, the resilient member, such as the spring, remains depressed. When the locking mechanism is actuated by a user, the retractable protrusion of the locking mechanism retracts from the first compartment and the spring pushes at least a portion of the bridge block out of the first compartment when the locking mechanism is in an unlocked orientation. The locking mechanism is actuated by a user when a user depresses a button in communication with the retractable protruding structure or by any other means of moving the protruding structure in and out of the first compartment.

Figure 53:
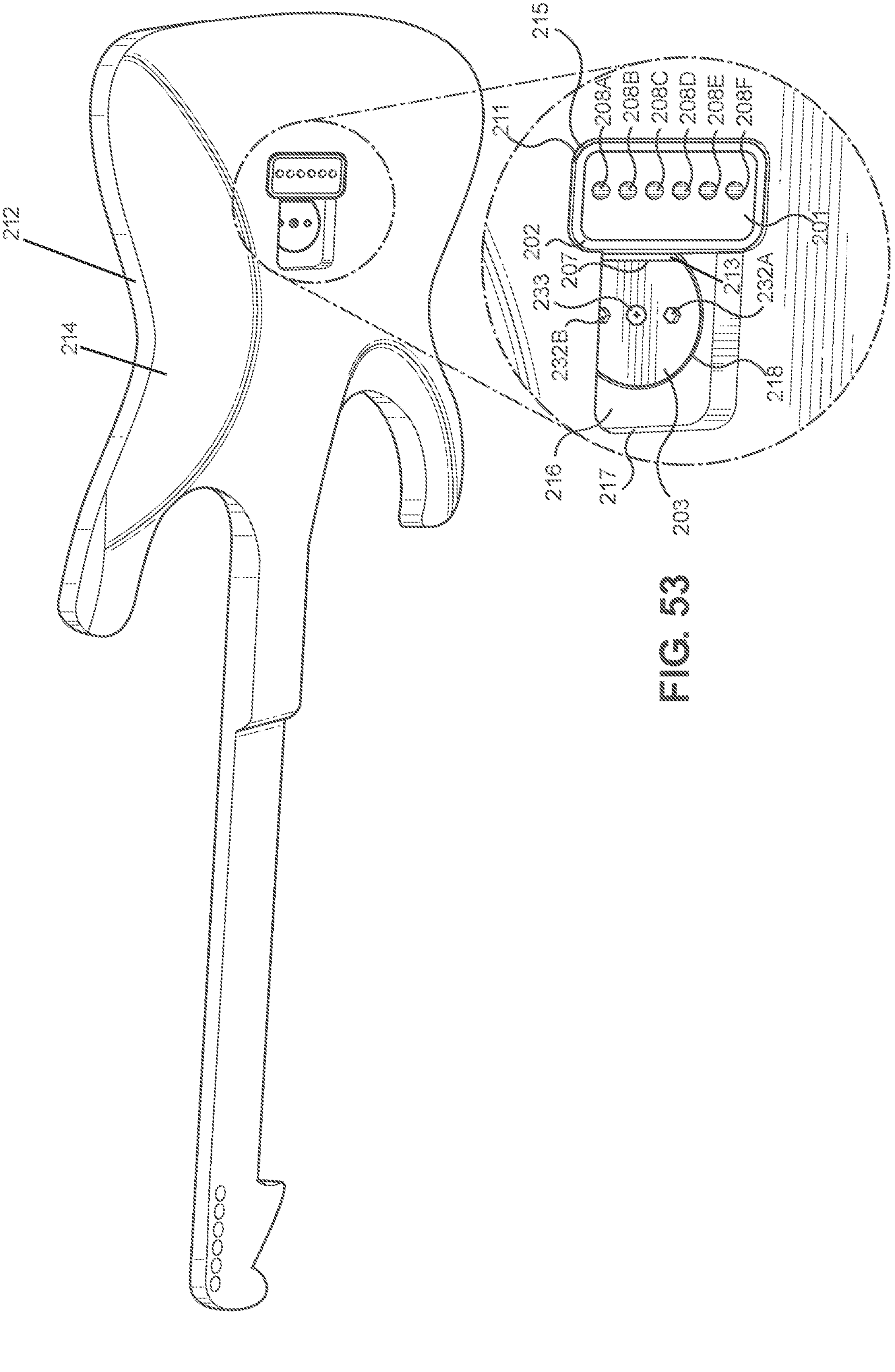
FIG. 53 is a rear view of a body of a guitar having a first compartment having a bridge block being retained within the support structure of the body of a guitar, a second compartment retains a plate.
Figure 54:
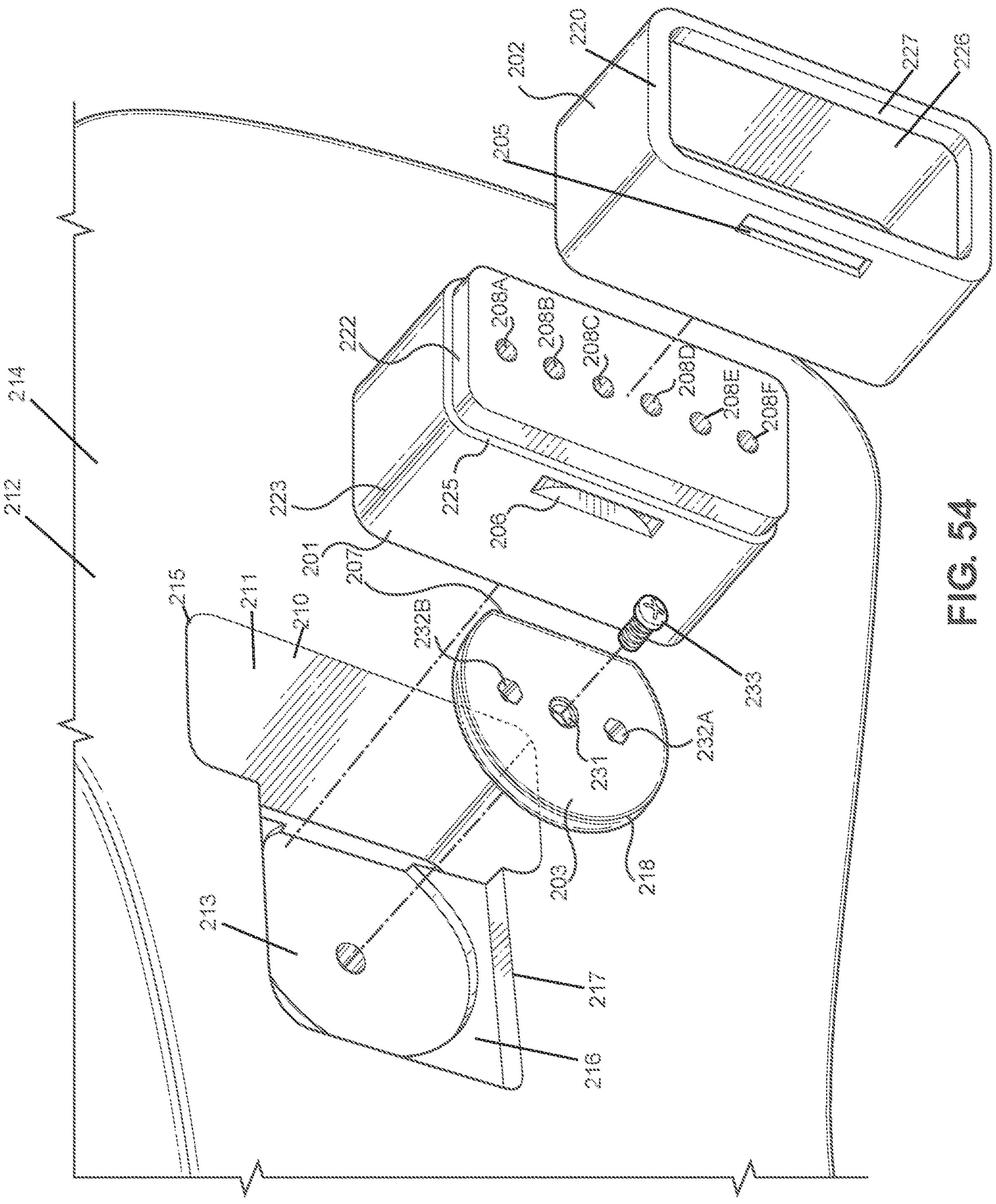
FIG. 54 is a rear exploded view of the locking mechanism in an unlocked configuration having a plate with a flat portion positioned parallel to the recess of the bridge block, the bridge block is retained within the support structure of the body of a guitar.

FIGS. 52-54 show guitar 212 having body portion 214. Body 214 of guitar 212 has opening 215 (FIG. 54) bordering first compartment 211. First compartment 211 has an inner wall surface 210 (FIG.54). FIG. 52 shows guitar string 224 traverses through an opening of bridge 204 and opening 229D of bridge block 201.

FIG. 54 best shows bridge block 201 having outer wall surface 223 that connects with inner wall surface 226 of support structure 202 when bridge block 201 is installed in support structure 202. Edge 227 of flange 220 of support structure 202 connects with stepped portion 222 of bridge block 201 when bridge block 201 is installed in support structure 202. Stepped portion 222 of bridge block 201 is surrounded by the edge 227 of flange 220. Bridge block 201 is retained within first compartment 211 of body 214 of guitar 212. Inner wall surface 210 of first compartment 211 is connected with support structure 202 when support structure 202 is installed in first compartment 211.

Figure 55:
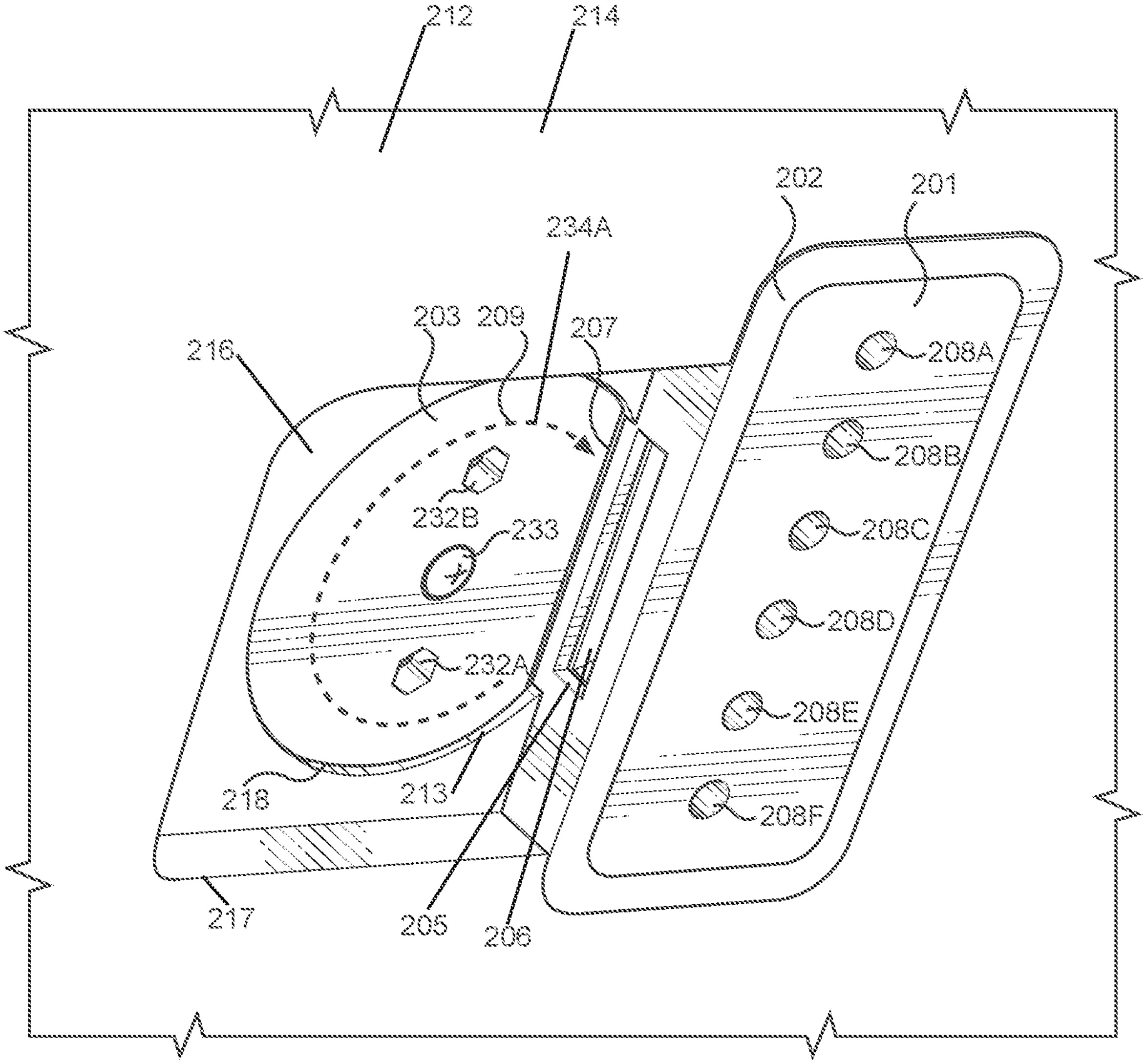
FIG. 55 is a rear perspective view of the locking mechanism in an unlocked configuration having a plate with a flat portion positioned parallel to the recess of the bridge block, the bridge block is retained within the support structure of the body of a guitar; and, FIG. 56 is a rear perspective view of the locking mechanism in a locked configuration having a plate with a substantially curved portion retained within the recess of the bridge block, the bridge block is retained within the support structure of the body of a guitar.
Figure 56:
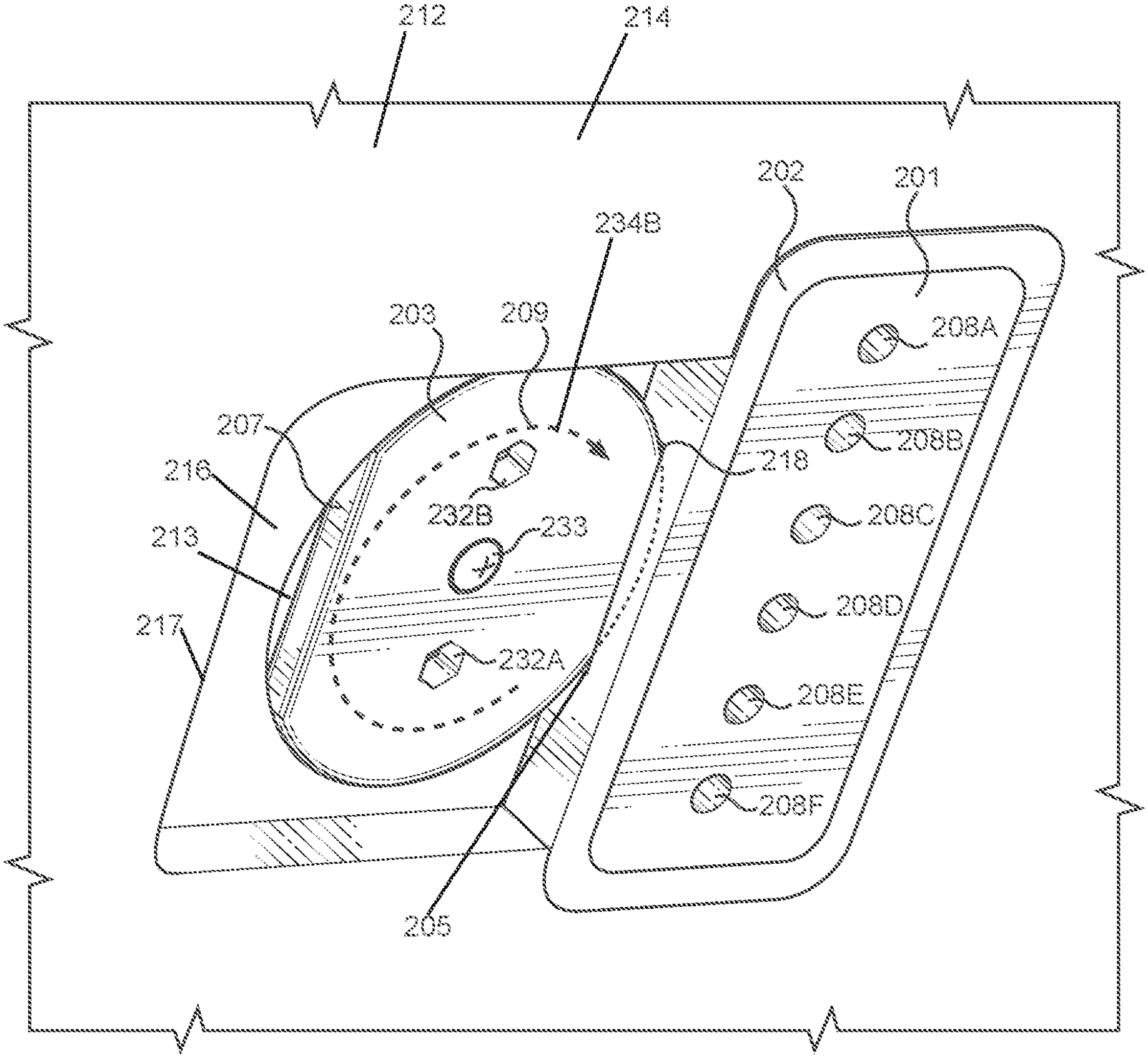

Referring to FIGS. 53-56, plate 203 is retained within recess 213 of second compartment 216 of body 214 of guitar 212. Second opening 217 boarders second compartment 216. FIGS. 55-56 best show that plate 203 is configured to rotate 209 within recess 213 of second compartment 216 of body 214 of guitar 212 to orient substantially curved edge 218 of plate 203 to be retained within recess 206 of bridge block 201 and opening 205 of support structure 202, whereby, the locking mechanism is in a locked orientation 234B (FIG. 56). Plate 203 is configured to rotate 209 within recess 213 of second compartment 216 of body 214 of guitar 212 to orient flat edge 207 of plate 203 to be substantially parallel to recess 206 of bridge block 201 and opening 205 of support structure 202, whereby, the locking mechanism is in an unlocked orientation 234A (FIG. 55).

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

The invention claimed is:

1. A removable bridge block system for a guitar, comprising:

a guitar, said guitar having a body portion with a front side and a rear side, said body portion of said guitar having a first opening traversing an entire length of the body of the guitar from the front side to the rear side and bordering a first compartment, said first compartment having an inner wall surface;

a bridge block having an outer wall surface, said bridge block is partially retained within said first compartment of said body portion of said guitar, at least a portion of the bridge block is exposed at both the front side and the rear side of the body portion of the guitar, said bridge block has an external side wall having a recess; and, a locking mechanism, said locking mechanism having a plate, said plate having a substantially curved outer perimeter edge, said plate having a flat outer perimeter edge, said plate is retained within a second compartment located at the rear side of said body of said guitar, the plate is perpendicular to the side wall of the bridge block, a second opening borders said second compartment, said plate to rotate within said second compartment of said body of said guitar to orient said substantially curved edge of said plate to be retained within said recess of said bridge block, whereby, said locking mechanism is in a locked orientation, said plate is configured to rotate within said second compartment of said body of said guitar to orient said flat edge of said plate to be substantially parallel to said recess of said bridge block, whereby, said locking mechanism is in an unlocked orientation.

2. The removable bridge block system for a guitar of claim 1, further comprising a support structure connected to at least a portion of said inner wall surface of said first compartment, said support structure having a first side wall connected to a second side wall, said second side wall is connected to a third side wall, said third side wall is connected to a fourth side wall, said fourth side wall is connected to said first side wall, a flange extends from the bottom edge of the said first sidewall, said second sidewall, said third sidewall, and said fourth sidewall.

3. The removable bridge block system for a guitar of claim 2, further comprising said support structure having at least one opening located on at least one side wall of said first side wall, said second side wall, said third side wall, or said fourth side of said support structure, said at least one opening of said support structure is in alignment with said recess of said bridge block and is configured to receive at least a portion of said substantially curved edge of said plate when said locking mechanism is oriented in a locked orientation.

4. The removable bridge block system for a guitar of claim 2, further comprising said bridge block having a first portion and a stepped portion, said first portion having a greater perimeter than a perimeter of said stepped portion.

5. The removable bridge block system for a guitar of claim 4, further comprising said flange of said support structure having an inner wall surface connected to said step of said bridge block, whereby, said stepped portion of said bridge block is surrounded by an edge of said flange.

6. The removable bridge block system for a guitar of claim 1, further comprising said second compartment of said body of said guitar having a recess retaining said plate of said locking mechanism.

7. A removable bridge block system for a guitar, comprising:

a guitar, said guitar having a body portion with a front side and a rear side, said body portion of said guitar having a first opening traversing an entire length of the body of the guitar from the front side to the rear side and bordering a first compartment, said first compartment having an inner wall surface;

a bridge block having an outer wall surface, said bridge block is partially retained within said first compartment of said body portion of said guitar, said bridge block has an external side wall having a recess; and a locking mechanism retained within a second compartment located at the rear side of the body of the guitar, at least a portion of said locking mechanism is perpendicular to the side wall of the bridge block and connects to said recess of said bridge block to orient said locking mechanism in a locked orientation, at least a portion of said locking mechanism disconnects with said recess of said bridge block to orient said locking mechanism in an unlocked orientation, at least a portion of the bridge block is accessible by a portion of the locking mechanism from the rear side of the body portion of the guitar.

8. The removable bridge block system for a guitar of claim 7, further comprising a support structure connected to at least a portion of said inner wall surface of said first compartment, said support structure having a first side wall connected to a second side wall, said second side wall is connected to a third side wall, said third side wall is connected to a fourth side wall, said fourth side wall is connected to said first side wall, a flange extends from the bottom edge of the said first side wall, said second side wall, said third side wall, and said fourth side wall.

9. The removable bridge block system for a guitar of claim 8, further comprising said support structure having at least one opening located on at least one side wall of said first side wall, said second side wall, said third side wall, or said fourth side of said support structure, said at least one opening of said support structure is in alignment with said recess of said bridge block and is configured to receive said at least a portion of said locking mechanism when oriented in a locked orientation.

10. The removable bridge block system for a guitar of claim 8, further comprising said bridge block having a first portion and a stepped portion, said first portion having a greater perimeter than a perimeter of said stepped portion.

11. The removable bridge block system for a guitar of claim 10, further comprising said flange of said support structure having an inner wall surface connected to said step of said bridge block, whereby, said stepped portion of said bridge block is surrounded by an edge of said flange.

12. The removable bridge block system for a guitar of claim 7, further comprising said second compartment of said body of said guitar having a recess retaining said at least a portion of said locking mechanism.

13. A removable bridge block system for a guitar, comprising:

a guitar, said guitar having a body portion with a front side and a rear side, said body portion of said guitar having a first opening traversing an entire length of the body of the guitar from the front side to the rear side and bordering a first compartment, said first compartment having an inner wall surface;

a bridge block having an outer wall surface, said bridge block is partially retained within said first compartment of said body portion of said guitar, said bridge block has an external side wall having a recess; and, a locking mechanism located at the rear side of the body of the guitar, at least a portion of said locking mechanism is perpendicular to the side wall of the bridge block and is configured to engage said recess of said bridge block when said locking mechanism is positioned in a locked orientation, at least a portion of the bridge block is accessible by a portion of the locking mechanism from the rear side of the body portion of the guitar.

14. The removable bridge block system for a guitar of claim 13, further comprising a support structure connected to at least a portion of said inner wall surface of said first compartment, said support structure having a first side wall connected to a second side wall, said second side wall is connected to a third side wall, said third side wall is connected to a fourth side wall, said fourth side wall is connected to said first side wall, a flange extends from the bottom edge of the said first side wall, said second side wall, said third side wall, and said fourth side wall.

15. The removable bridge block system for a guitar of claim 14, further comprising said support structure having at least one opening located on at least one side wall of said first side wall, said second side wall, said third side wall, or said fourth side of said support structure, said at least one opening of said support structure is in alignment with said recess of said bridge block.

16. The removable bridge block system for a guitar of claim 14, further comprising said flange of said support structure having an inner wall surface connected to said step of said bridge block, whereby, said stepped portion of said bridge block is surrounded by an edge of said flange.

17. The removable bridge block system for a guitar of claim 13, further comprising said bridge block having a first portion and a stepped portion, said first portion having a greater perimeter than a perimeter of said stepped portion.

18. The removable bridge block system for a guitar of claim 13, further comprising said at least a portion of said locking mechanism is a slidable latch.

19. The removable bridge block system for a guitar of claim 13, further comprising said at least a portion of said locking mechanism is a disk.

20. The removable bridge block system for a guitar of claim 13, further comprising said at least a portion of said locking mechanism is a plate.

* * * * *